US012053420B1

(12) United States Patent
Richards

(10) Patent No.: US 12,053,420 B1
(45) Date of Patent: Aug. 6, 2024

(54) SMART-ASSISTIVE MOBILITY APPARATUS AND ASSOCIATED SYSTEMS AND METHODS

(71) Applicant: Joseph Richards, Reno, NV (US)

(72) Inventor: Joseph Richards, Reno, NV (US)

( * ) Notice: Subject to any disclaimer, the term of this patent is extended or adjusted under 35 U.S.C. 154(b) by 767 days.

(21) Appl. No.: 17/102,121

(22) Filed: Nov. 23, 2020

Related U.S. Application Data

(60) Provisional application No. 62/939,078, filed on Nov. 22, 2019.

(51) Int. Cl.
*A61G 5/00* (2006.01)
*A61G 5/02* (2006.01)
*A61G 5/04* (2013.01)
*A61G 5/10* (2006.01)
*A61G 5/14* (2006.01)

(52) U.S. Cl.
CPC ............... *A61G 5/14* (2013.01); *A61G 5/022* (2013.01); *A61G 5/04* (2013.01); *A61G 5/1056* (2013.01); *A61G 2203/12* (2013.01); *A61G 2203/20* (2013.01); *A61G 2203/34* (2013.01)

(58) Field of Classification Search
CPC . A61G 5/14; A61G 5/022; A61G 5/04; A61G 5/1056; A61G 2203/12; A61G 2203/20; A61G 2203/34
See application file for complete search history.

(56) References Cited

U.S. PATENT DOCUMENTS

| | | | |
|---|---|---|---|
| 6,003,891 | A | 12/1999 | Broadhead |
| 6,250,661 | B1 | 6/2001 | Dickie et al. |
| 6,276,704 | B1 | 8/2001 | Suiter |
| D451,849 | S | 12/2001 | Noshi |
| 7,017,686 | B2 | 3/2006 | Kamen et al. |
| 7,635,164 | B2 | 12/2009 | Torres et al. |
| 7,717,447 | B2 | 5/2010 | Orford |
| 8,322,741 | B2 | 12/2012 | Laslo et al. |

(Continued)

FOREIGN PATENT DOCUMENTS

| | | |
|---|---|---|
| GB | 2456077 | 7/2009 |

OTHER PUBLICATIONS

"Convaid Rodeo Tilt-In-Space Wheelchair—Transit Model" found at https://www.shopwheelchair.com.
"Quickie Xtender" found at https://www.sunrisemedical.com.

*Primary Examiner* — Truc M Do

(74) *Attorney, Agent, or Firm* — John Rizvi; John Rizvi, P.A—The Patent Professor®

(57) ABSTRACT

A smart-assistive mobility apparatus comprising a frame configured to allow a seated user to swing the user's feet under a seat to push the apparatus in a desired direction with automated and autonomous assistance. The seat is also automatically displaceable in response to detection by the system of a user attempting to stand up. Sensors operatively connected to a motor(s) detect a user intent vector and apply an assistive force to complement that user intent vector. A rules engine of the smart-assistive mobility system may receive a user intent vector; receive a usage data analysis metric; match at least one of the user intent vector and the usage data analysis metric to a rule condition; and determine, by firing an action of the rule, an assistive action command (e.g., stand up assist, sit down assist, move forward assist, move backward assist, move rotate assist, or move exercise assist).

20 Claims, 20 Drawing Sheets

(56) References Cited

U.S. PATENT DOCUMENTS

| | | | | |
|---|---|---|---|---|
| D677,606 | S | 3/2013 | Akre | |
| 8,540,266 | B2 | 9/2013 | Baker | |
| 8,844,959 | B2 | 9/2014 | Winter, V et al. | |
| 9,010,787 | B2 | 4/2015 | Slagerman et al. | |
| 9,033,360 | B2 | 5/2015 | Davis et al. | |
| D732,439 | S | 6/2015 | Childs et al. | |
| 9,398,988 | B1 | 7/2016 | DeMirza | |
| 9,452,096 | B2 | 9/2016 | Jahkel et al. | |
| 9,907,713 | B2 | 3/2018 | Dahlin et al. | |
| 9,999,557 | B2 | 6/2018 | Diaz-Flores et al. | |
| D823,175 | S | 7/2018 | Theilmann | |
| 2015/0359699 | A1* | 12/2015 | Chang | A61H 3/04 701/22 |
| 2016/0242977 | A1* | 8/2016 | Richter | A61G 5/048 |
| 2017/0266069 | A1* | 9/2017 | Lozano | A61G 5/04 |
| 2018/0014988 | A1* | 1/2018 | Diaz-Flores | A61G 5/023 |
| 2018/0116898 | A1 | 5/2018 | Morbi et al. | |
| 2018/0280213 | A1 | 10/2018 | Hancock et al. | |
| 2019/0060144 | A1 | 2/2019 | St-Cyr et al. | |

* cited by examiner

826

| | IF.CONDITION | THEN.ACTION |
|---|---|---|
| (1002) | FirstBoot := TRUE | Activate.InitializationSequence |
| (1004) | InitializationSequence.Complete | Activate.Stop |
| (1006) | FirstBoot := FALSE | Activate.RulesEngine |
| (1008) | LeftWheel.Moment := CCW(negative) | Measure := Sustain(1) |
| (1010) | RightWheel.Moment := CW(positive) | Measure := Sustain(2) |
| (1012) | Seat.Acceleration := Backward(negative) | Measure := Sustain(3) |
| (1014) | UpperSeatSensor.Pressure := Increase(versus.baseline(1)) | Measure := Sustain(4) |
| (1016) | LowerSeatSensor.Pressure := Decrease(versus.baseline(2)) | Measure := Sustain(5) |
| (1018) | Sustain(1) && Sustain(2) && Sustain(3) && Sustain(4) && Sustain(5) >= Threshold | Activate.AssistMoveForward |
| (1020) | AssistMoveForward.Duration <> OperationRange | Activate.CaptureMotionParameters(Repository) |
| (1022) | AssistMoveForward.Duration <> OperationRange | Activate.DecelSequence |
| (1024) | DecelSequence >= Limit | Activate.Stop |
| (1026) | SafetyLoop := TRUE | Activate.Stop |
| (1028) | SafetyLoop := TRUE && ResetCommand := TRUE | Activate.ResetSequence |
| (1030) | SystemTime >= LastUpdate + Offset | Upload.Repository |

FIG. 10

826

| | IF.CONDITION | THEN.ACTION |
|---|---|---|
| (1002) | FirstBoot := TRUE | Activate.InitializationSequence |
| (1004) | InitializationSequence.Complete | Activate.Stop |
| (1006) | FirstBoot := FALSE | Activate.RulesEngine |
| (1118) | InitializationSequence(1) | Activate.Training(AssistStandUp) |
| (1120) | InitializationSequence(2) | Activate.Training(AssistMoveForward) |
| (1122) | InitializationSequence(3) | Activate.Training(AssistMoveBackward) |
| (1124) | InitializationSequence(4) | Activate.Training(AssistMoveRotate) |
| (1126) | InitializationSequence(5) | Activate.Training(AssistExerciseHealth) |
| (1128) | InitializationSequence(6) | Activate.Training(AssistGeolocation) |
| (1130) | Activate.Training(All) := COMPLETE | Activate.CaptureMotionParameters(Repository) |
| (1132) | Activate.CaptureMotionParameters(Repository) := COMPLETE | Upload.Repository && InitializationSequence.Complete |

FIG. 11

SMART-ASSISTIVE MOBILITY APPARATUS AND ASSOCIATED SYSTEMS AND METHODS

CROSS-REFERENCE TO RELATED APPLICATIONS

This application claims the benefit of U.S. Provisional Patent Application No. 62/939,078, filed on Nov. 22, 2019, which is incorporated by reference herein in its entirety.

FIELD OF THE INVENTION

The present invention relates generally to mobility solutions and, more particularly, to mobility methods, systems, and devices augmented with smart-assistive functionality.

BACKGROUND OF THE INVENTION

Mobility and daily living aids are designed to help a user maintain balance and/or to move in ways that the user's body cannot safely and reliably support on its own. Various mobility devices known in the art are commonly used by older adults, physical injury/surgery patients, and persons with disabilities and/or weight problems. For example, crutches and canes help support body weight by transmitting load from a user's legs to the upper body. Similar function is provided by walkers, which are commonly constructed of a metal or composite framework comprising multiple legs. Walkers are designed to be placed in front of a user and moved (either by lifting or by repositioning using glides and/or wheels) each time the user takes a step. For users who are unable to consistently put weight on lower limbs, wheelchair designs allow an individual to sit while rolling the device from one location to another. Wheelchairs typically include at least two wheels and a seat, and are available in designs that permit manual propulsion, mechanical drive (e.g. via an electric motor), and/or pushing by caregivers. Other commonly available maximum assistance and/or special application mobility and daily living aids include scooters, stair lifts, and custom ramps/handrails.

Unfortunately, the load-shifting designs of many common mobility aids necessarily result in reduction in a user's exercise of those muscles that are targeted for isolation by each aid. Negative health impacts such as muscle atrophy are common, especially after prolonged periods of inactivity due to reliance on mobility aids. In some cases, such reliance may be temporary. For example, a person with a leg or back injury may require several months or even years to fully recover. In other cases, reliance on mobility aids may be permanent. For example, a senior adult may progress from use of a walker, to a wheelchair, and ultimately to a scooter as basic motions become more physically difficult with age. A particular problem with the most laborsaving mobility aid designs, such as wheelchairs and scooters, is that they force a user into a sitting position for long periods of time and, therefore, discourage regular exercise of the limbs. For example, a user's legs may seldom be worked out because even manual wheelchairs are not optimally configured to be pushed by the user's legs. Instead, primarily the user's arms are used to roll such a device's wheels. Wheelchairs and/or scooters with electronic steering mechanisms compound this problem, as a user need only move the hands or fingers to drive these devices.

Another problem with wheelchair designs is that they typically feature seat configurations that scoop a user's body, often forcing the user to sit slouched over and fully back into the seat in a way that may prevent proper blood circulation to the user's limbs. Furthermore, scooped seat configurations often result in a user requiring physical assistance from caregivers to exit the wheelchair. Although merely exiting a wheelchair may in itself present a significant workout for a mildly disabled user, the amount of force needed to lift one's own body from a scoop seat often exceeds the capabilities of many more physically challenged users.

Accordingly, there is a need for a solution to at least one of the aforementioned problems. For instance, there is an established need for a mobility aid that works out a user's limbs, torso, and/or core muscles and that facilitates proper blood circulation, while also providing safe and reliable weight support as well as motion-enabling assistance.

SUMMARY OF THE INVENTION

The present invention is directed to a mobility aid that delivers tailored assistive forces to augment a user's own unique physical capabilities, and also to devices, systems, and processes for detecting, storing, reporting, and analyzing smart-assist mobility aid metrics related to ongoing use of the mobility aid by the user. Such use characteristics analysis results may be processed to automatically and continuously modify operation of the mobility aid to fit user needs. A data connection means (e.g., wired and/or wireless data communication) may be employed to relay the use characteristics information to one or more external computing resources for post-processing using an analysis app and/or computer program.

In a first implementation of the invention, a smart-assistive mobility apparatus may comprise:

- a frame configured to allow a user to swing the user's feet under the seat to push or pull the apparatus while the user is seated (e.g. when the user pulls forward, the user's legs start in front of the user and end underneath the user);
- a seat configured to automatically displace in response to detection of a user attempting to stand up; and
- one or more sensors configured to detect a user intent vector, and operatively connected to one or more motors configured to apply an assistive or resistive force according to the detected user intent vector. For example, the resistive force may help the user build muscle via resistance training when the user has become strong enough to surpass the need of assistance.

In another aspect of the invention, the frame may include a V-shaped base having a vertex positioned at a back end of the apparatus (notably, the shape or profile need not limited to a "V" and may instead have a "W" shape or any appropriate shape without departing from the spirit and scope of the disclosure).

In another aspect of the invention, the frame may include a base that may be attached at three points to respective wheels, where two wheels may be located at a front end of the base and one wheel may be located at a back end of the frame near a vertex of the base.

In another aspect of the invention, the frame may include an upper arch supporting and extending over a seat within the arch such that the frame may arc over a seated user (notably, the arc may extend up to a shoulder area of the user and not over the user's head, as a non-limiting example).

In another aspect of the invention, the seat may comprise one or more of a mesh, a plastic, and a fabric supported by one or more straps that may operate to tighten upon system detection of a user attempting to stand up from the seat and may operate to loosen upon system detection of a user attempting to sit down into the seat.

In another aspect of the invention, one or more straps may attach between an upper arch of the frame, the upper arch supporting a seat therebetween and the straps operable to tighten or loosen upon system detection of a user attempting to stand up from or sit down into the seat.

In another aspect of the invention, the seat may include one or more straps each operable to support a respective leg or thigh of a user.

In another aspect of the invention, the seat may include one or more straps each operable to support a respective lower, middle, or upper back of the user.

In another aspect of the invention, detecting the user intent vector may include detecting a force applied by the user to displace the apparatus.

In another aspect of the invention, applying the assistive force may include applying torque to one or more wheels of the apparatus via one or more motors in a direction of the user intent vector so as to assist displacement in the direction of the user intent vector.

In another aspect of the invention, the apparatus may include a hand-controlled remote control or joystick that may be operable to cause motors of the apparatus to displace the apparatus according to operation of the remote control.

In another aspect of the invention, the apparatus may include a seat configured to position a user with feet near proximate ground, and may be operable to move forward over the ground in response to the user pushing the apparatus by pulling the ground under the user via the feet.

In another aspect of the invention, the system may be configured to detect a forward force and may automatically apply an assistive force in a direction intended by a user.

In another aspect of the invention, the system may facilitate leg exercise of a user while providing the user with an assistive force in an intended direction of movement.

In another aspect of the invention, the system may free a user's hands to at least some extent by determining an intent force vector from the user's application of forces to proximate ground via feet and controlling activation of drive motors in accordance with the intent force vector. For example, a user may pull or push on a proximate desk with hands to drive the apparatus instead of using legs based on one or more sensors detecting a user intent force being applied. The user may be able to use hands or arms to communicate to the sensor(s) an intent force vector by pushing down and/or leaning on an arm rest of the apparatus to turn left or right (similar to the way one would steer a horse). Similar intent force vector communication may be supported in conjunction with torso/twisting movements operable to rotate the apparatus.

In another aspect of the invention, the system may include one or more sensor(s) configured to detect gravitational force applied to a seat by a user's body. When that gravitational force reduces and decreases past a threshold value, the seat may be operable to reposition (e.g., raise) in response, for example, either by tightening straps via servo motors, linear actuators, or any appropriate mechanism.

In another aspect of the invention, a system may be configured to reposition (e.g., raise, lower, angle) a seat gradually in response to gradual changes to seating forces (e.g. gravitational force of a user's body).

In another aspect of the invention, displacement, velocity, acceleration, inertia, and/or momentum may be monitored to determine a seat repositioning condition.

In another aspect of the invention, a predefined displacement of an apparatus's straps may begin autonomous repositioning of a seat.

In another aspect of the invention, a velocity of motion of the apparatus's straps may be used to determine a condition that a seat is to be repositioned.

In another aspect of the invention, an acceleration value of the apparatus's straps or a rate of change of a force may be used to determine conditions for repositioning a seat.

In another aspect of the invention, inertia and/or momentum parameters including mass and/or velocity may be used to determine a seat repositioning condition.

In another aspect of the invention, the apparatus's straps may be positioned to support a user's thighs.

In another aspect of the invention, the apparatus's straps may be positioned to support a user's buttocks region.

In another aspect of the invention, the apparatus's straps may be positioned to support a user's lower back.

In another aspect of the invention, the apparatus's straps may be positioned to support a user's middle back.

In another aspect of the invention, the apparatus's straps may be positioned to support a user's upper back.

In another aspect of the invention, one or more motors for tightening the apparatus's straps may comprise servo motor and/or linear actuator devices fixed within or upon the apparatus's frame.

In another aspect of the invention, the apparatus's straps may be fabricated of one or more of elastic, plastic, metal, and/or fabric.

In another aspect of the invention, the base of the apparatus may be supported by at least two wheels.

In another aspect of the invention, a smart-assist mobility system may comprise:

- a processor,
- a data store,
- a data connection (e.g., a wired interface such as a USB port, and/or a wireless interface such as Bluetooth®), and
- a user interface.

In a method aspect of the invention, the smart-assist mobility system operation may comprise the steps of:

- receiving a user intent vector,
- receiving a usage data analysis metric,
- matching at least one of the user intent vector and the usage data analysis metric to a condition of a rule, and
- determining, by firing an action of the rule, an assistive action command of an assist type selected from the group consisting of a stand up assist, a sit down assist, a move forward assist, a move backward assist, a move rotate assist, a move exercise assist, and a safety loop assist.

In another method aspect of the invention, the smart-assistive mobility system operation may comprise the assistive action command being directed to an operation of one of a wheel motor to deliver a move forward assistive force in a first direction common to the user intent vector and of a seat winding motor to deliver a stand up assistive force in a second direction common to the user intent vector.

In another method aspect of the invention, the smart-assistive mobility system operation may comprise, upon detection of one of the user intent vector and/or a user manual override (e.g., switch engage), the assistive action command being directed to an operation of one of a wheel brake to deliver a safety loop assistive force and of a seat winding brake to deliver a safety loop assistive force.

In yet another method aspect of the invention, the smart-assistive mobility system operation may comprise the steps of:

reporting the use characteristics to local external computing devices and/or to one or more networked computing resources for post-processing, receiving and recording from such post-processing resources a usage data analysis metric related to the reported use characteristics, altering, if a trigger condition of interest is detected, normal operation of the smart-assist mobility apparatus (up to and including disabling the smart-assist mobility apparatus) based on the usage data analysis metric, enabling, if a trigger condition of interest is not detected, normal operation of the smart-assist mobility apparatus, and shutting off, upon detection of a deactivation signal, the smart-assist mobility apparatus.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 10 presents a table illustrating exemplary machine learning rules for execution of forward movement assist for a smart-assistive mobility system, in accordance with an embodiment of the present invention;

FIG. 11 presents a table illustrating exemplary machine learning rules for initialization of baseline user parameters for a smart-assistive mobility system, in accordance with an embodiment of the present invention;

Like reference numerals refer to like parts throughout the several views of the drawings.

DETAILED DESCRIPTION

Figure 1A:
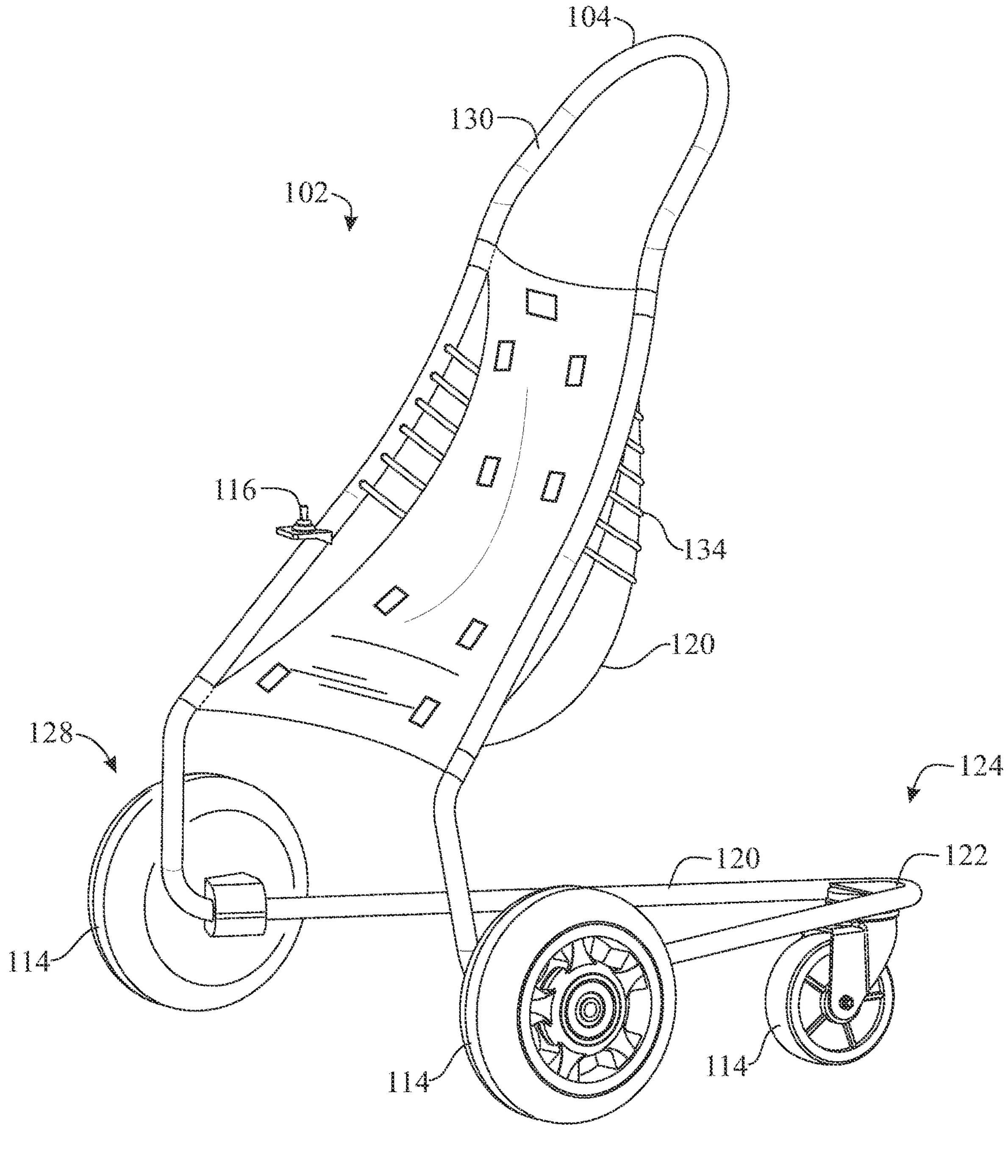
FIG. 1A presents a perspective view of a smart-assistive mobility apparatus, in accordance with a first embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIGS. 1A and 1B. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward systems, devices, and associated methods for operating a smart-assistive mobility aid that tailors assistance actions to user-specific requirements; and for detecting, storing, and reporting assistance metrics related to ongoing training and operation of the system by a user. Certain embodiments of the present invention may include a data-connected smart-assistive mobility system capable of manipulating use characteristics information related to a user's experience with the mobility aid. An onboard data connection means may exchange such usage data with external computing resources performing analyses of those data using a remote app and/or computer program. For example, and without limitation, the remote software app and/or computer program may execute on a nearby smart-phone, tablet, laptop and/or other electronic device. Also for example, and without limitation, the usage data may be transmitted via networking to a remote device for third-party review and/or analysis. The usage data analysis metrics may include, but are not limited to, records of the assistance levels per common mobility activities (e.g., stand up, sit down, push backward, pull forward, rotate, training/physical therapy), hours per assistance state (e.g., standing, moving, exercising, at rest), distance traveled and apparatus tracking, and assistance increase/decrease over time during operation of the smart-assistive mobility apparatus of interest. Software in the smart-assistive mobility aid device may report the user operation records (i.e., usage data) to a software app in a smartphone or computing device by way of a USB or other communications interface supported on the data-connected smart-assistive mobility device.

Figure 1B:
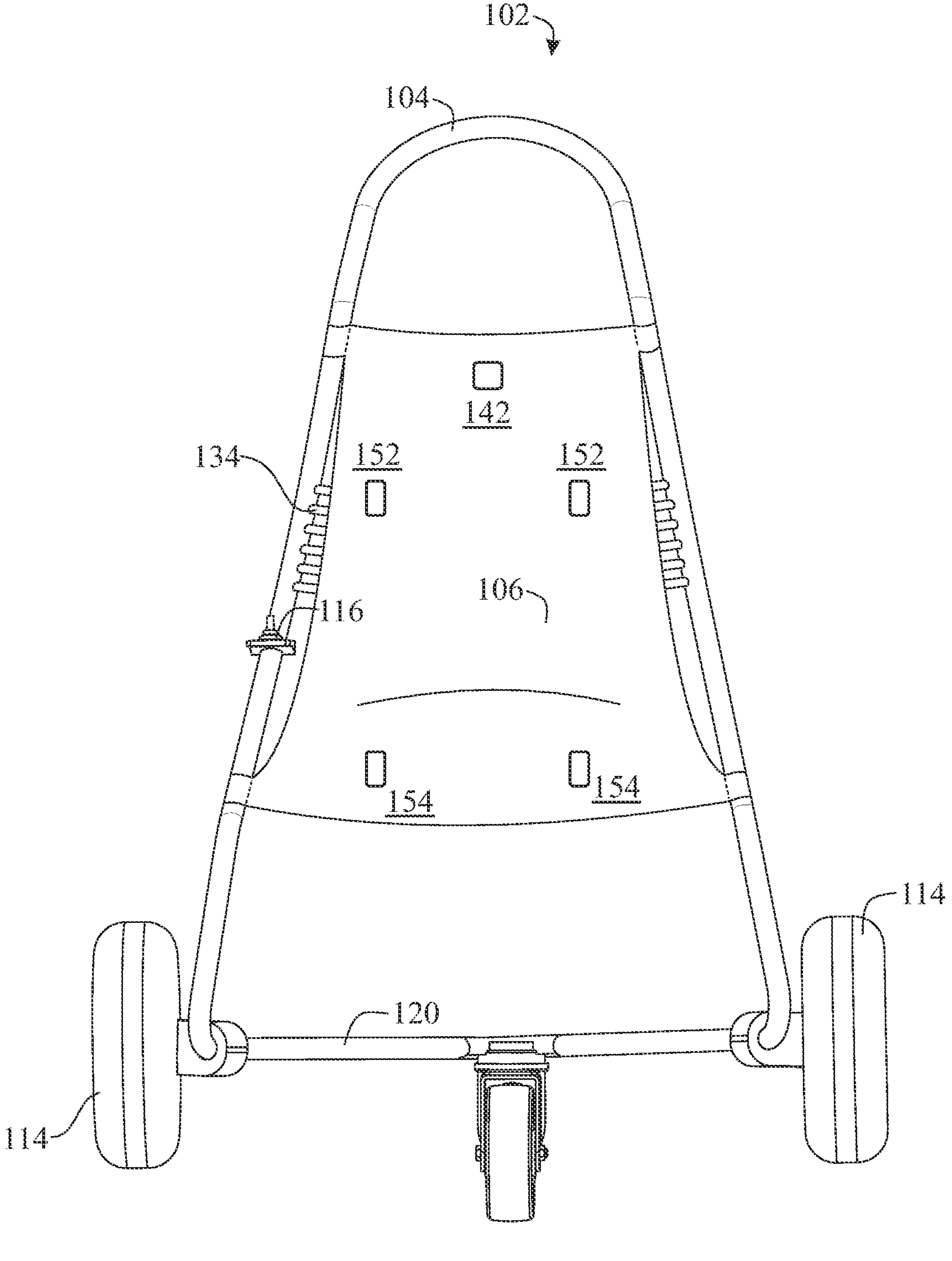
FIG. 1B presents a front elevation view of the smart-assistive mobility apparatus illustrated in FIG. 1A.

Referring initially to FIGS. 1A and 1B, disclosed is a smart-assistive mobility apparatus 102 comprising a frame 104 configured to carry a seat 106. For example, and without limitation, the frame 104 may be characterized by a V-shaped base 120 having a vertex 122 positioned at a back end 124 of the smart-assistive mobility apparatus 102. Also for example, and without limitation, the seat 106 may be constructed of a mesh or fabric, and may be mechanically connected to and positioned within the frame 104 to receive a sitting user and to orient the user's feet to swing freely under the seat 106. Besides providing balance and load-bearing function, the base 120 may also serve as a platform for storing items such as groceries or a backpack. A person of skill in the art will immediately recognize that, although FIG. 1A and related drawings herein show a V-shaped base 120, the base of the present invention may be any appropriate shape or be characterized by any appropriate profile while enabling the advantageous features described herein, such as operating to enable pushing of a smart-assistive mobility apparatus via a user's feet.

The smart-assistive mobility apparatus 102 may be configured for ease of movement along a substantially flat surface (e.g., analogous to a walker or wheelchair) or, alternatively, for stationary use (e.g., analogous to a recliner chair). For example, and without limitation, the frame 104 as shown in FIGS. 1A and 1B may have a base 120 attached at three points to wheels 114, such that two wheels 114 may be positioned at a front end 128 of the base 120 on laterally opposing sides of the seat 106 (e.g. when viewed from the front end 128 as in FIG. 1B) and such that one wheel 114 may be positioned at the back end 124 of the frame 104 proximate the vertex 122 of the base 120. A person of skill in the art will immediately recognize that a smart-assistive mobility apparatus may include no wheels or any number of wheels in any appropriate configuration. Also for example, and without limitation, the smart-assistive mobility apparatus 102 may include a hand-controlled remote control 116 or joystick to operate the smart-assistive mobility apparatus 102 to displace, turn, recline, adjust, and/or stop according to operation of the remote control 116.

Figure 2A:
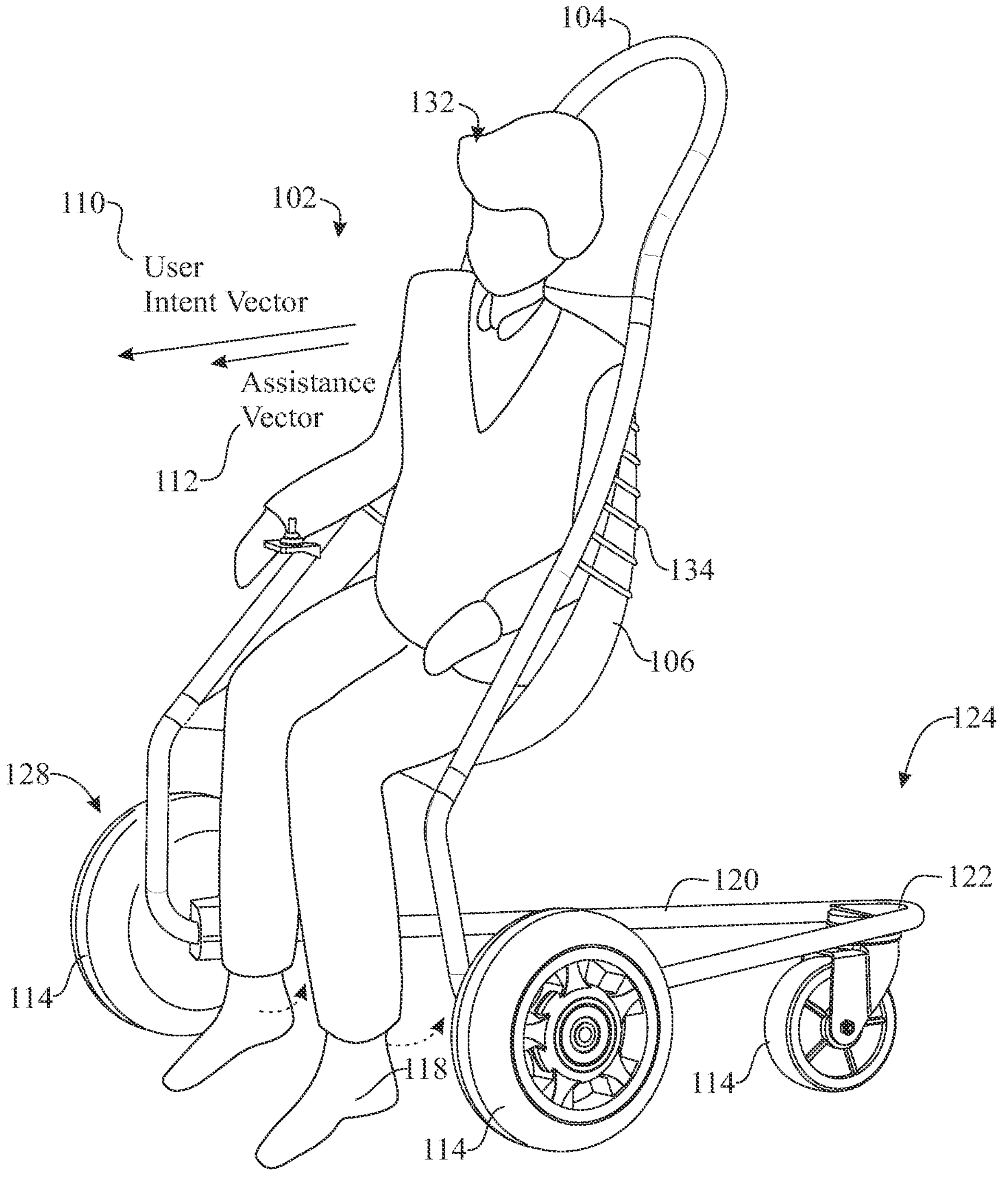
FIG. 2A presents a perspective view of the smart-assistive mobility apparatus illustrated in FIG. 1A as put to an exemplary use by a user.
Figure 2B:
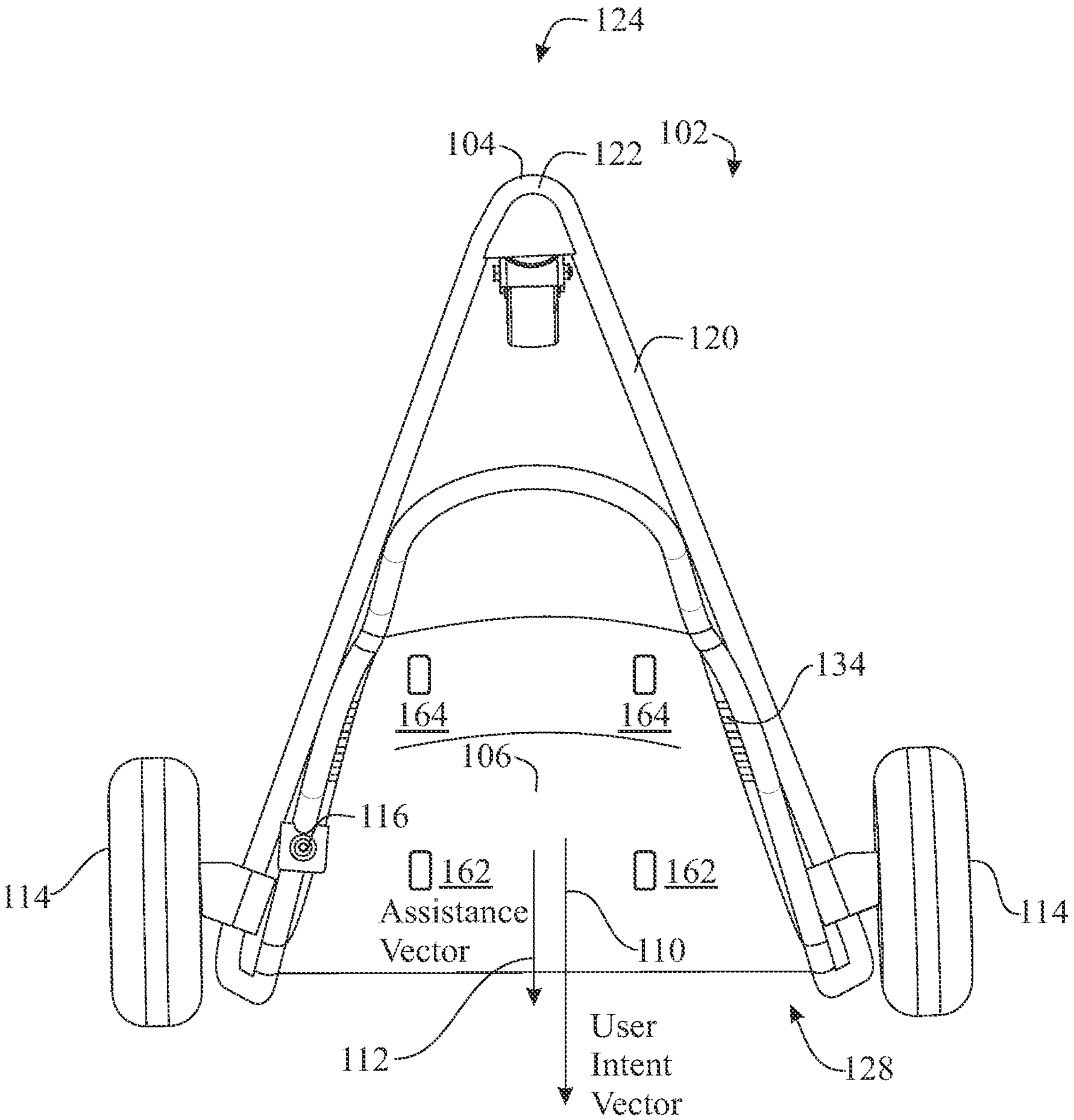
FIG. 2B presents a top view of the smart-assistive mobility apparatus illustrated in FIG. 1A as put to the exemplary use of FIG. 2A.
Figure 6A:
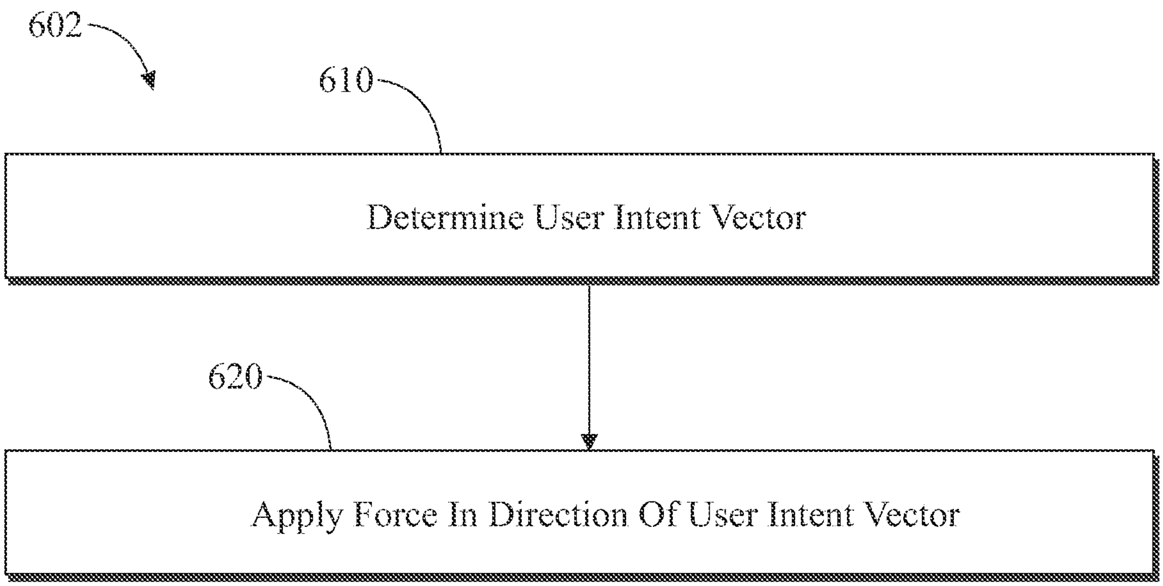
FIG. 6A presents a flowchart illustrating an exemplary smart-assistive mobility use case for applying a movement force in a direction of a user intent vector, in accordance with an embodiment of the present invention.

Referring now to FIGS. 2A and 2B, and continuing to refer to FIGS. 1A and 1B, the frame 104 may include an upper arch 130 extending over and supporting the seat 106 within the arch 130 (e.g. the seat 106 may be mechanically suspended within the arc 130 such that the frame 104 may arc over a seated user 132). For example, and without limitation, mechanical suspension of the seat 106 may be at least partially supported by one or more straps 134. As described above, the seat 106 may be positioned within the frame 104 to orient the user's feet 118 to swing freely under the seat 106. A person of skill in the art will immediately recognize that any appropriate seat/frame configuration that operates to allow a user to swing the user's feet under the seat may be included in the present invention. For example, and without limitation, any seat/frame configuration may be included in the present invention that may support a smart-assistive mobility system (as described hereinbelow) operating to apply an assistive force 112 (i.e., assistance vector) in response to detection of an intent force 110 (i.e., user's intent vector) to advance the apparatus 102 forward as determined from the user's legs, arms, and/or similar body-originated force. FIG. 6A illustrates the basic apparatus-moving use case 602 that comprises determining a user's intent vector for a desired movement (Block 610) and automatically applying complementary force in the direction of that intent vector (Block 620).

As used herein, a user intent vector may be a rotational or non-rotational force, without departing from the scope and spirit of the present disclosure. For example, and without limitation, a user may be sitting in a mobility apparatus as disclosed herein while desiring to grab a pen on a desk nearby. In such a scenario, a smart-assistive mobility system operably associated with the apparatus may detect a user intent vector that pulls or pushes the smart-assistive mobility apparatus, or that swivels or rotates the apparatus, and the system may operate the apparatus to assist in the direction of that user intent vector, whether it is a rotational force or non-rotational force that needs to be applied to assist in the intended motion of the user. The smart-assistive mobility apparatus thus may advantageously provide a smooth, fluid, dynamic, and unified movement, as if the apparatus is an extension of the user's body.

Figure 3A:
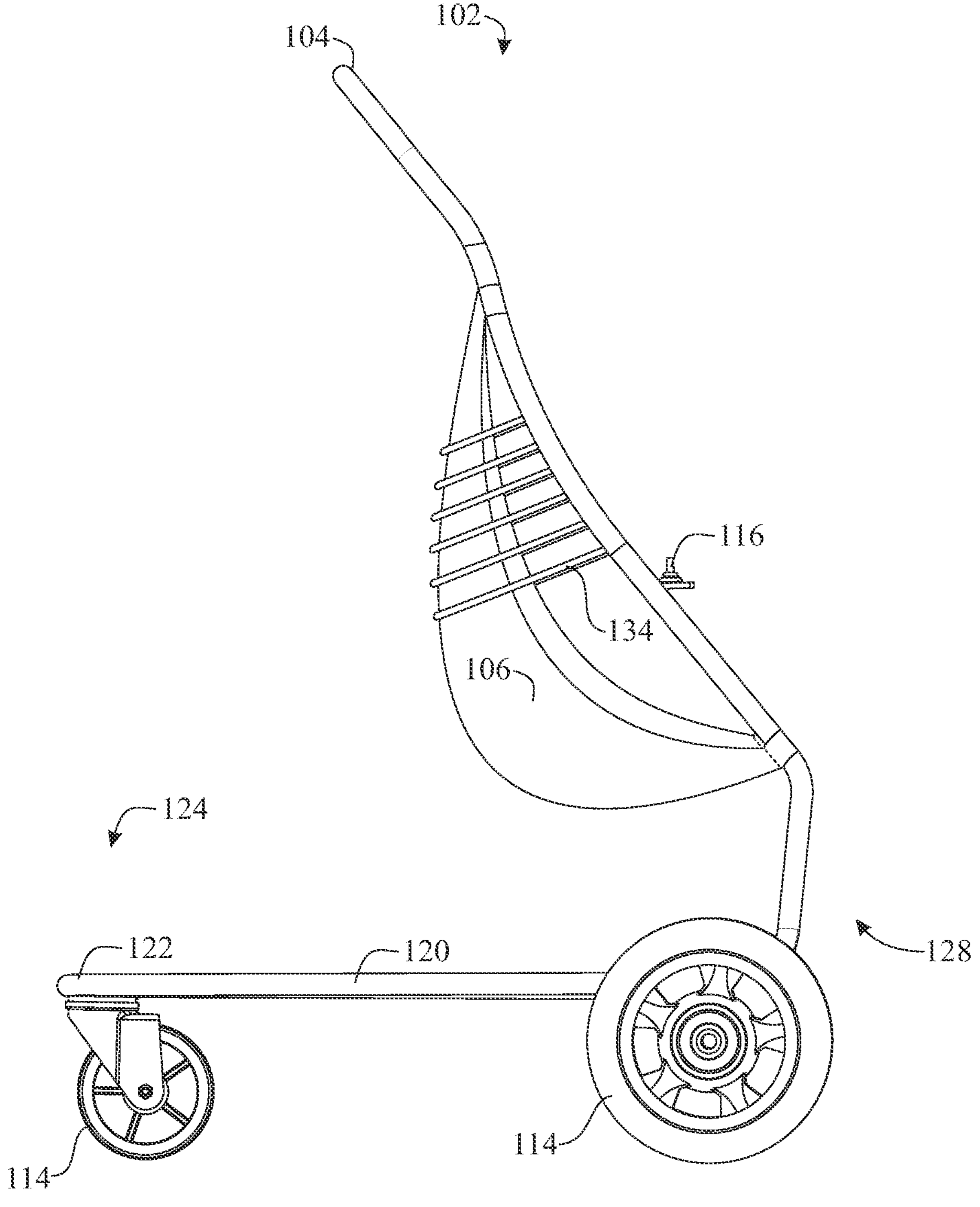
FIG. 3A presents a side elevation view of the smart-assistive mobility apparatus illustrated in FIG. 1A with seat in lowered position.
Figure 3B:
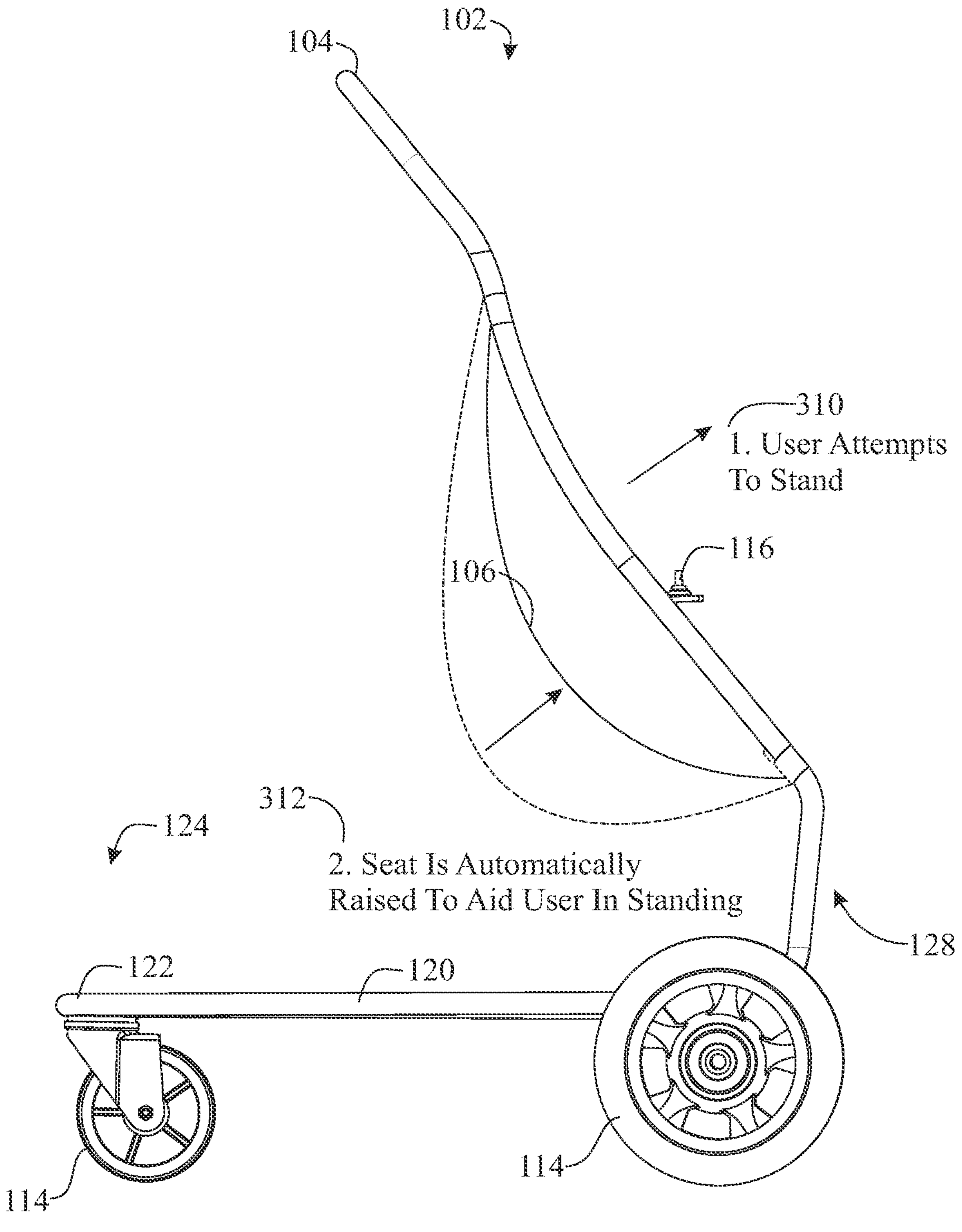
FIG. 3B presents a side elevation view of the smart-assistive mobility apparatus illustrated in FIG. 1A with seat in raised position.
Figure 3C:
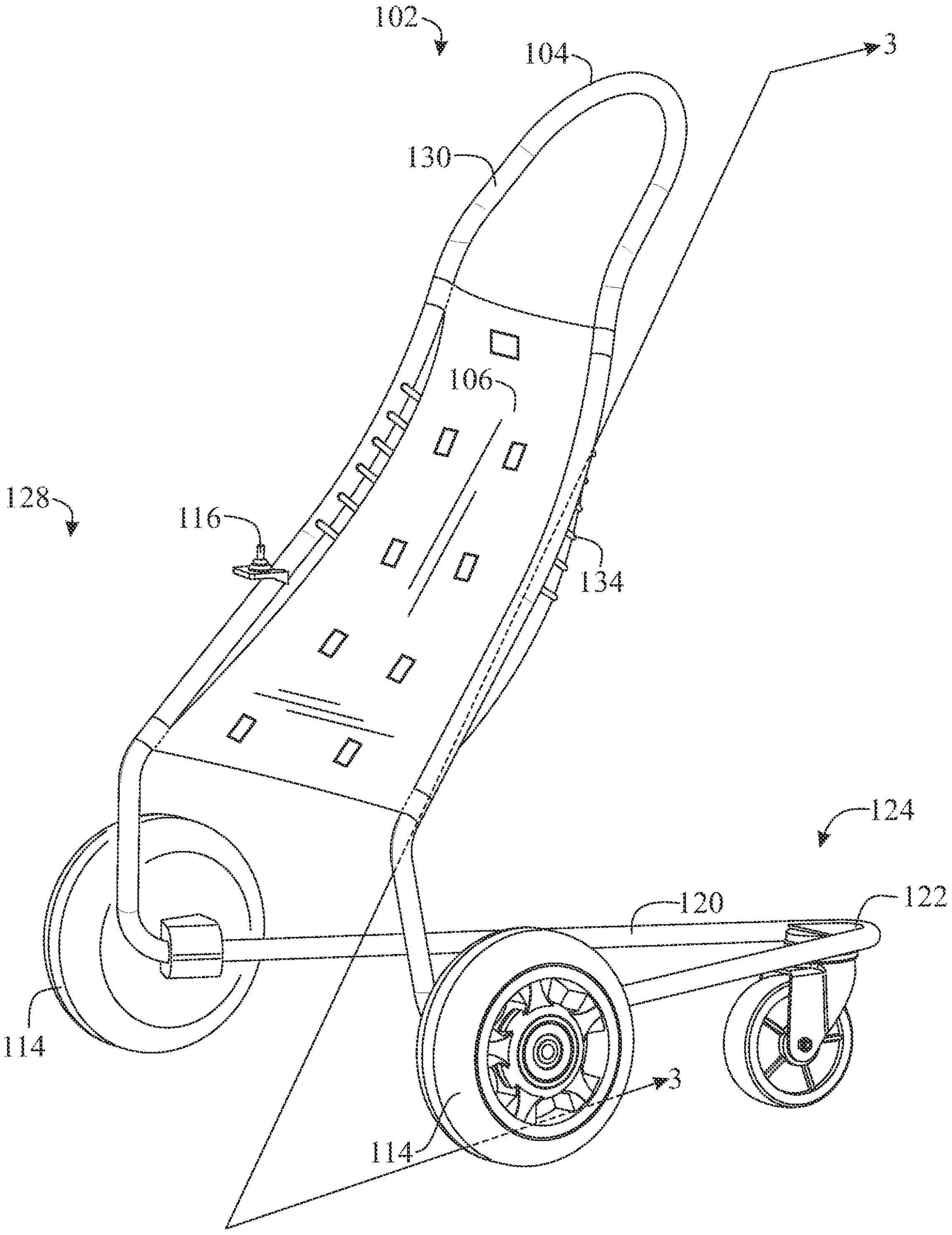
FIG. 3C presents a front perspective view of the smart-assistive mobility apparatus illustrated in FIG. 1A with seat in raised position as in FIG. 3B.
Figure 6B:
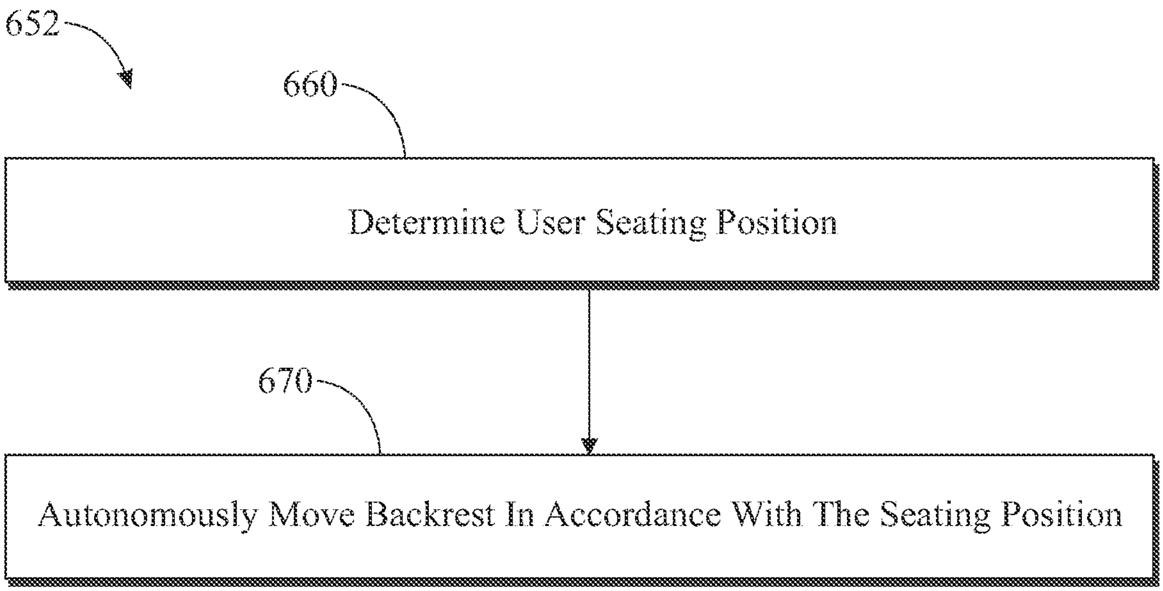
FIG. 6B presents a flowchart illustrating an exemplary smart-assistive mobility use case for autonomously moving a backrest to complement a user seating position, in accordance with an embodiment of the present invention.

Referring now to FIGS. 3A, 3B, and 3C, and continuing to refer to FIGS. 1A and 1B, an exemplary operation of the smart-assistive mobility apparatus of FIG. 1A to apply an assistive force 112 upon detection of a user intent force 110 to attempt to stand up will now be described in detail. FIG. 3A illustrates the mobility apparatus 102 in a starting state as if a user (not shown) is seated within the apparatus 102. As shown, the straps 134 may be in a released position, causing the seat 106 to relax into a generally scooped shape to enable safe and comfortable seating by the user. Upon detection by a smart-assistive mobility system (as described hereinbelow) of an intent vector 310 signifying the user's attempt to stand up, the system may operate the apparatus 102 to apply an assistive vector 312 to automatically lean and/or raise the seat 106 to help the user complete the desired standing action. FIG. 6B illustrates the basic seat-manipulating use case 652 that comprises determining a user's seating state/position (Block 660) and automatically adjusting the seat to accomplish the desire seating position (Block 670).

Figure 4:
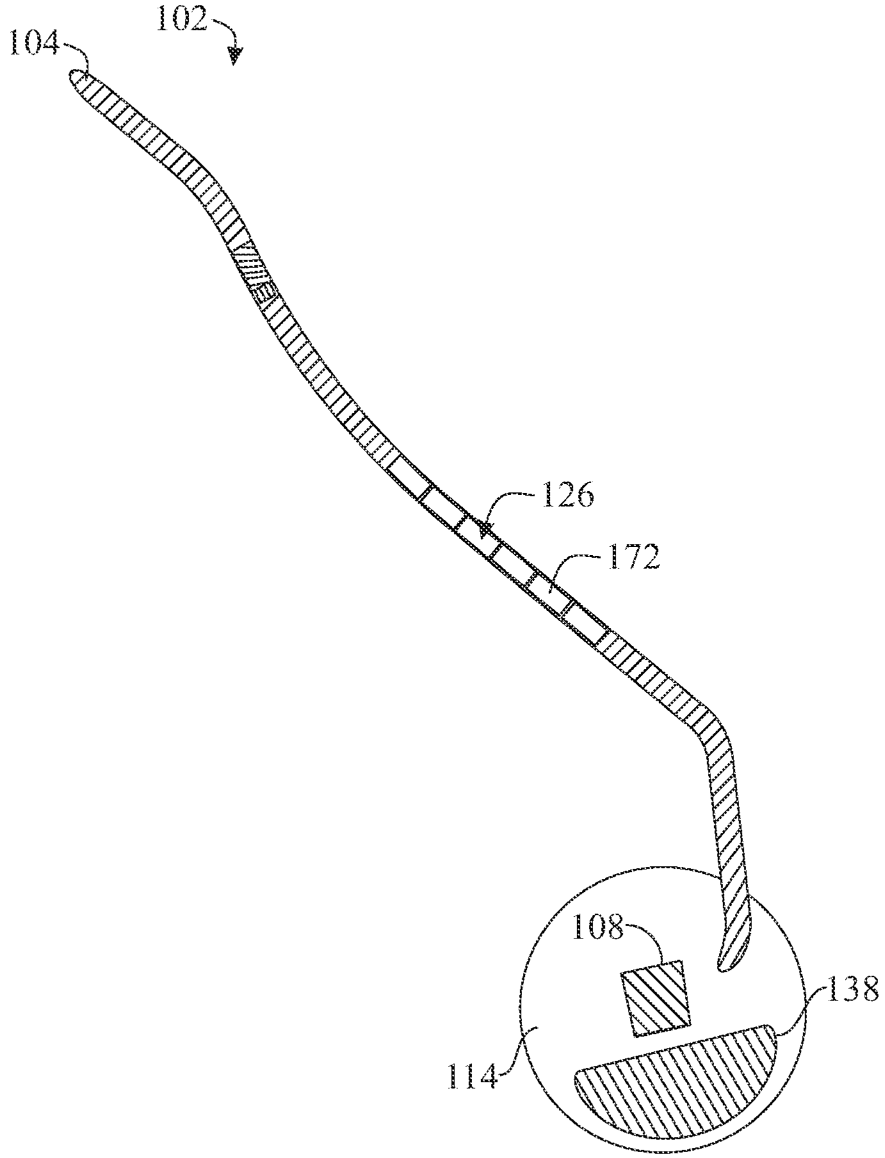
FIG. 4 presents a cross sectional inner side view of the smart-assistive mobility apparatus illustrated in FIG. 1A with motors visible, and as taken along plane 3-3 in FIG. 3C.

Referring now to FIG. 4, and continuing to refer to FIGS. 1A, 1B, 3A, 3B, and 3C, mechanisms for applying an assistive force in response to detection of a first embodiment of a user intent force will now be described in detail. For example, and without limitation, a smart-assistive mobility apparatus 102 may be configured to carry one or more sensors 142 each configured to detect a respective user intent vector 110, and one or more drive components (e.g., motors 108, brakes 138) configured to apply an assistive force 112 according to the detected user intent vector 110. Detecting the user intent vector 110 may include detecting a force applied by a user to displace the smart-assistive mobility apparatus 102 from a starting position (e.g., forward movement, as described hereinabove and in FIG. 6A). For example, and without limitation, applying the assistive force 112 may include operating the drive motor(s) 108 to apply torque to one or more wheels 114 of the smart-assistive mobility apparatus 102 in a direction of the user intent vector 110 so as to assist displacement in the direction of the user intent vector 110. A person of skill in the art will immediately recognize that drive motors and/or braking systems (for operating the wheels and/or the adjustable seats) may be positioned at any appropriate or reasonable part of the smart-assistive mobility apparatus.

As generally described above for FIGS. 2A and 2B, the frame 104 may be configured to allow a user 132 to swing the user's feet 118 under the seat 106 to push the smart-assistive mobility apparatus 102 while the user is seated. For example, and without limitation, the user may be sitting in the smart-assistive mobility apparatus 102 with the user's feet 118 near the ground, and the user 132 may be able to push the smart-assistive mobility apparatus 102 forward by pulling the ground under the user 132 via the user's feet 118. The sensor(s) 142 of the smart-assistive mobility system (described below) may detect such a forward force 110 and may automatically determine and apply an assistive force 112 in a direction intended by the user 132. This operational capability may advantageously facilitate leg exercise by a user while providing the user with an assistive force. This operational capability also may advantageously free up a user's hands to at least some extent because the user's intent force vector may allow the user to control activation of the drive motor(s) 108 by applying forces to the ground via the user's feet.

Continuing to refer to FIGS. 1A, 1B, 3A, 3B, 3C, and 4, mechanisms for applying an assistive force in response to detection of a second embodiment of a user intent force will now be described in detail. For example, and without limitation, a smart-assistive mobility apparatus 102 may be configured to carry one or more sensors 152, 154, 162, 164, 172 each configured to detect a respective user intent vector 310, and one or more servo motors 126 configured to apply an assistive force 312 according to the detected user intent vector 310. Detecting the user intent vector 310 may include detecting a force applied by a user to transition the user seated in the smart-assistive mobility apparatus 102 to a standing position (e.g., standing action, as described hereinabove and in FIG. 6B). As described above, a seat 106 may comprise a flexible or otherwise shapeable material supported by one or more straps 134 that may be individually or in combination tightened automatically in response to detection of a user attempting to stand up from the apparatus 106 (see FIGS. 3B and 3C) and loosened automatically in response to the detection of a user attempting to sit down on the apparatus 106 (see FIG. 3A). For example, and without limitation, one or more straps 134 may attach between an upper arch 130 of the frame 104 with the upper arch 130 supporting the seat 106 therebetween. A person of skill in the art will immediately recognize that the seat 106 may be constructed of any appropriate material and any number of straps 134 may be employed to raise or lower the seat 106. The straps 134 may be positioned at any appropriate load-bearing point, such as to support a user's thighs, buttocks region, and/or lower, middle, and upper back regions. Also as a non-limiting example, the system use case described in FIG. 6A speaks to not only to delivering assistive forces for standing up, but also provides for assistive forces to adjust normal seat height position to improve circulation and posture. For example, the system may adjust the apparatus to a default position of the seat that may determine if a user sits toward the edge of the seat or sits slouched toward the back of the seat.

Also for example, and without limitation, one or more sensors 152, 154, 162, 164, 172 may be operable to detect gravitational force applied to the seat by a user's body. As a non-limiting example, pressure sensors may be included in a seat back (upper 152 and/or lower 154) and thighs/buttocks area (forward 162 and/or rear 164) of a seat, or on any operationally-conducive part of the apparatus 102 described above. When sensor-detected gravitational force decreases in magnitude past a threshold value, a smart-assistive mobility system (described hereinbelow) may operate to raise the seat 106 either by tightening the straps 134 via servo motors 126 or any appropriate mechanism. The raising of the seat may happen gradually in response to gradual changes to seating forces (e.g. gravitational force on the user's body).

Alternatives to straps may be employed to lift and/or lower a user in certain embodiments of a smart-assistive mobility aid as disclosed herein. As a non-limiting example, a linear actuator (not shown) may be configured to push up on a plate mounted in a mesh seat. Also for example, and without limitation, legs (not shown) of a smart-assistive mobility aid may extend/retract telescopically and/or may be configured to bend forward to push a user upward and to bend back to ease a user downward. Also for example, and without limitation, a smart-assistive mobility aid as disclosed herein may be configured to change its structural configuration (e.g. disfigure) (either with or without employing motors) to help tip the user in and/or out of a seat portion.

Although a user's bodily force on a seat through gravitation may be monitored as described above to determine if a user is attempting to stand up, a person of skill in the art will immediately recognize that other physics parameters may be used for that determination, such as displacement, velocity, acceleration, inertia, and/or momentum. For example, and without limitation, a certain displacement of the straps may trigger the autonomous raising of the seat described above. Alternatively, or in addition, a velocity of motion of the straps may be used to determine a condition that the seat is to be raised. Alternatively, or in addition, an acceleration value of the straps or rate of change of a force may be used to determine the conditions for raising the seat. Alternatively, or in addition, inertia and/or momentum parameters which include mass and velocity may be used to determine the seat rising condition.

An inertial sensor may be mounted in the arch and configured to detect minute swings in the apparatus. For instance, in the event a user leans forward and starts to stand, the natural spring reaction of the frame shape may be used to propel the inertial sensor (e.g. mounted above the user's head in the arch) forward indicating a force consistent with standing and, consequently, the forces of gravitational (pressure) sensors in the seat (or strap servos). Furthermore, the servos may be operated to act like rubber bands, characterized by a normal position being fully taught but as a user sits into them, they input just as much bodyweight as they receive to the sensors. This input may be synchronized with an algorithm that relates to angular displacement of the servo and resistance force (tension) applied by the servo, ultimately caused by the position of the user (more seated versus less seated).

A person of skill in the art will immediately recognize that a smart-assistive mobility apparatus may be configured in a wide variation of advantageous shapes and/or sizes for ease of handling by a consumer and/or for aesthetic effect. The materials used to construct the smart-assistive mobility apparatus may be ordinary materials or specialized materials for specific applications. For example, and without limitation, a simple design may include a frame made of a strong, light material and a seat and straps constructed of a durable elastic fabric that may be comfortable to a user. The center of gravity of the apparatus may be specifically designed such that users of various weights and sizes may sit comfortably in the seat without the frame tipping. To achieve such advantageous balance for safety and/or comfort, the seat and the above described arch may be angled backward as shown in the figures, and as may be understood from reasonable variations thereof.

Figure 5A:
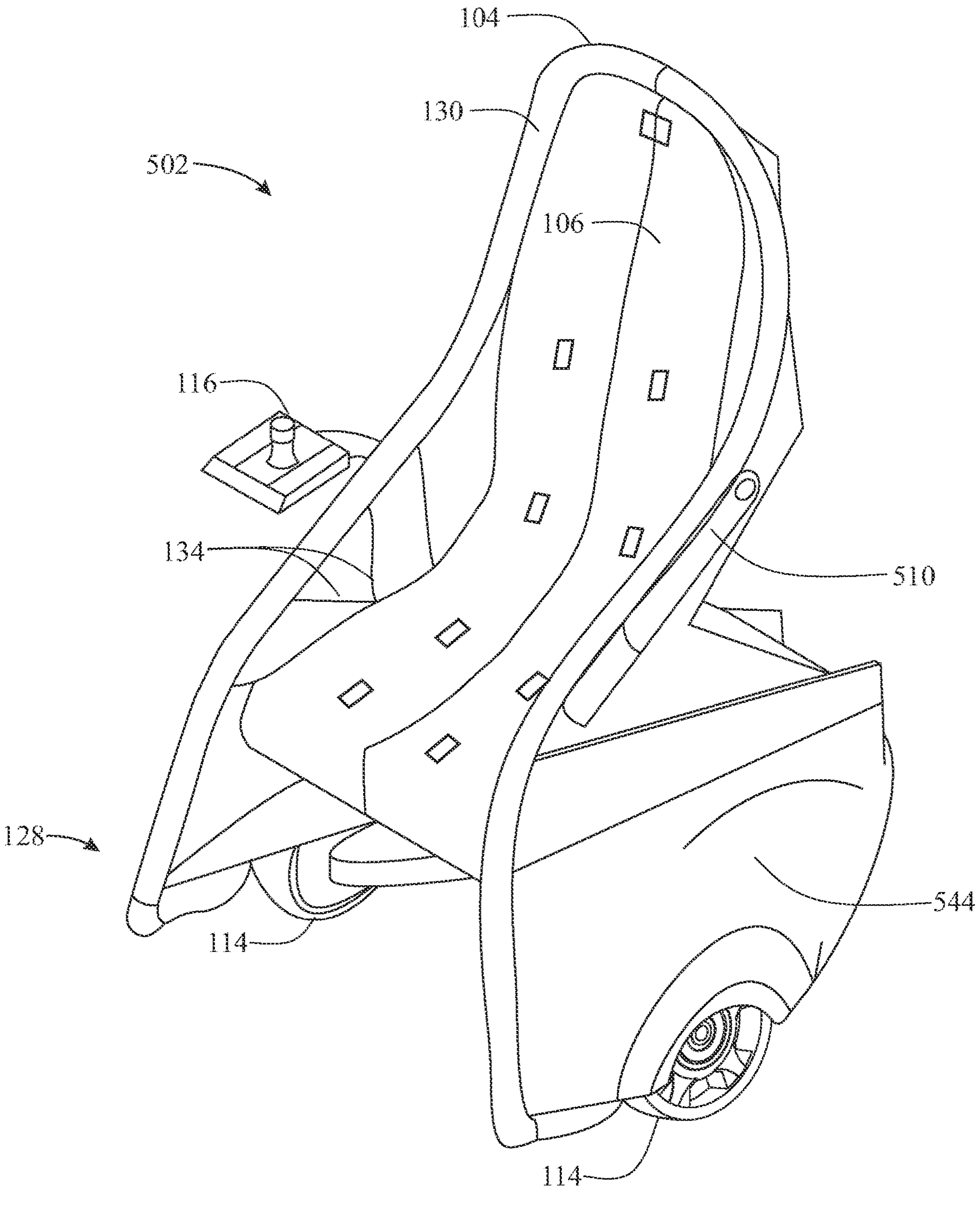
FIG. 5A presents a perspective view of a smart-assistive mobility apparatus, in accordance with a second embodiment of the present invention.
Figure 5B:
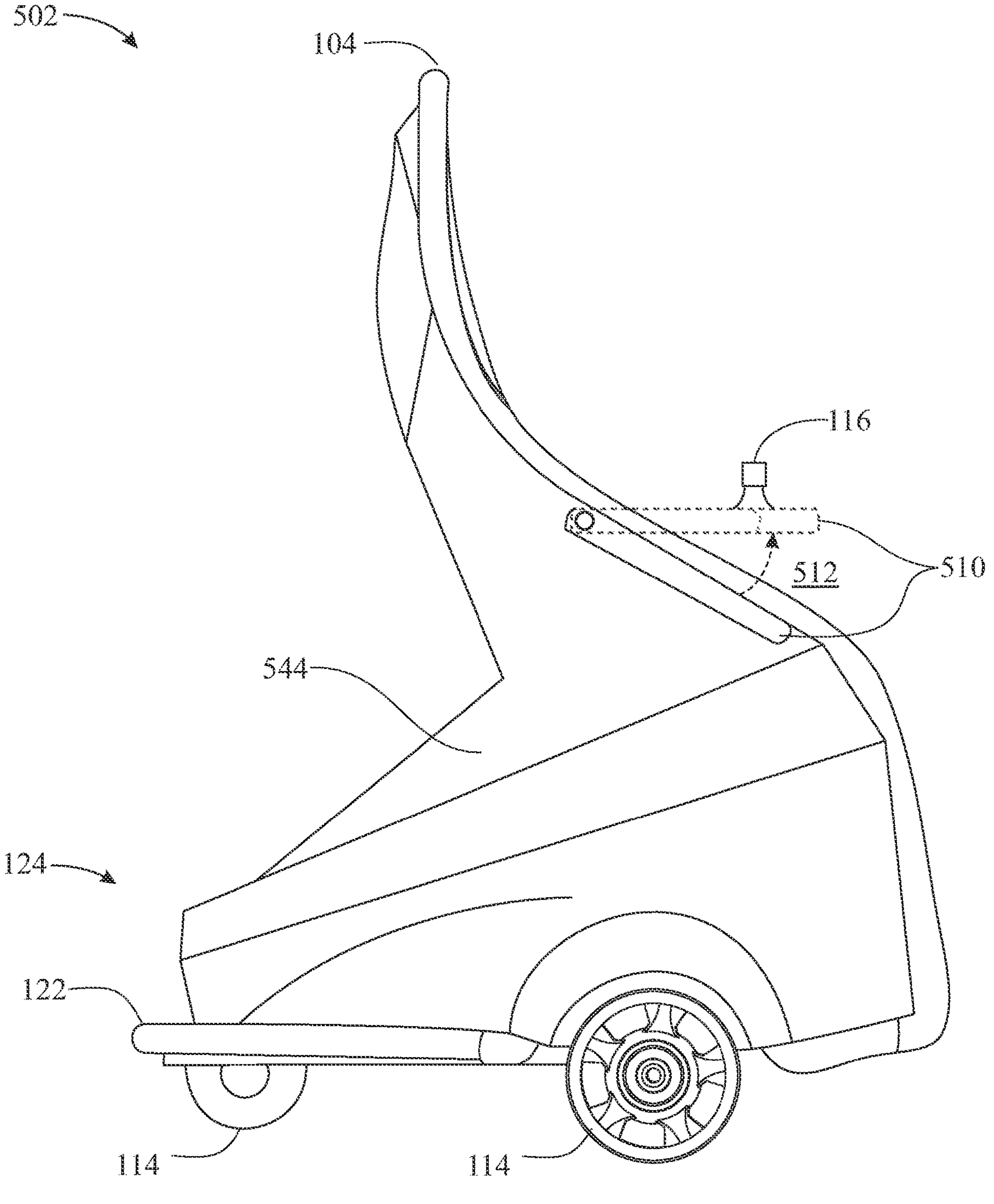
FIG. 5B presents a side elevation view of the smart-assistive mobility apparatus illustrated in FIG. 5A.
Figure 5C:
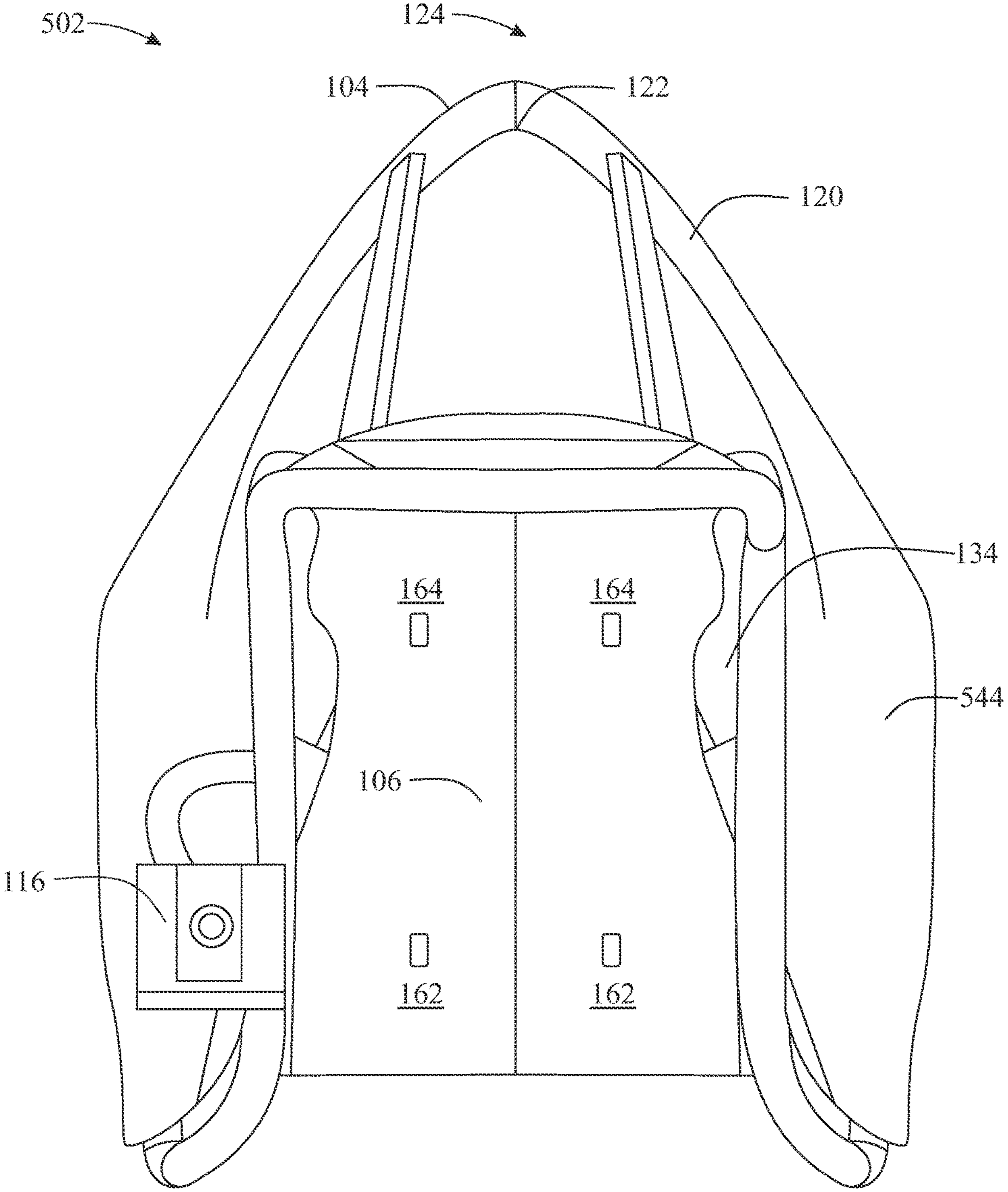
FIG. 5C presents a top view of the smart-assistive mobility apparatus illustrated in FIG. 5A.
Figure 5D:
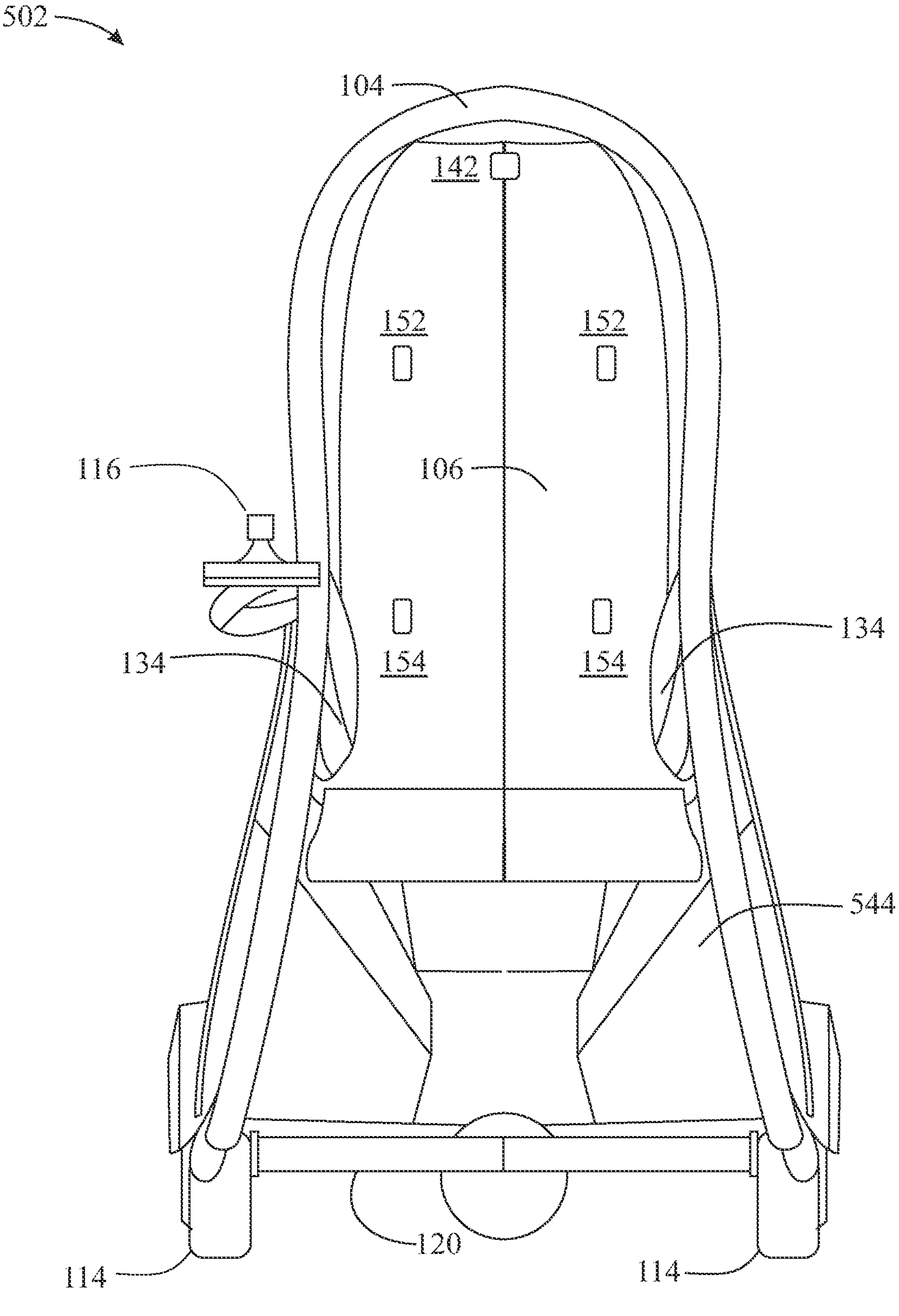
FIG. 5D presents a front elevation view of the smart-assistive mobility apparatus illustrated in FIG. 5A.

Apparatus construction may include various hoods and skirts to conceal a frame and to provide a full look. For example, and referring additionally to FIGS. 5A, 5B, 5C, and 5D, an alternative embodiment of a smart-assistive mobility apparatus 502 is shown that may include some or all of the features listed and described hereinabove for apparatus 102 of FIGS. 1A and 1B. Additional features such as, for example, and without limitation, handles 510 (e.g., fixed or deployable 512) may be mechanically attached to the frame 104 to advantageously equip a standing user to operate the apparatus 502 as a walker. A person of skill in the art will immediately recognize that handles may be configured to deploy either in front of the apparatus 502 (as shown in FIG. 5B) or behind the apparatus 502 (not shown) to advantageously support walker-mode operation by a user from either side of the apparatus 502. Also for example, and without limitation, a body member 544 may be mechanically attached to the frame 104 to advantageously add structural integrity and/or aesthetic effect.

Figure 7:
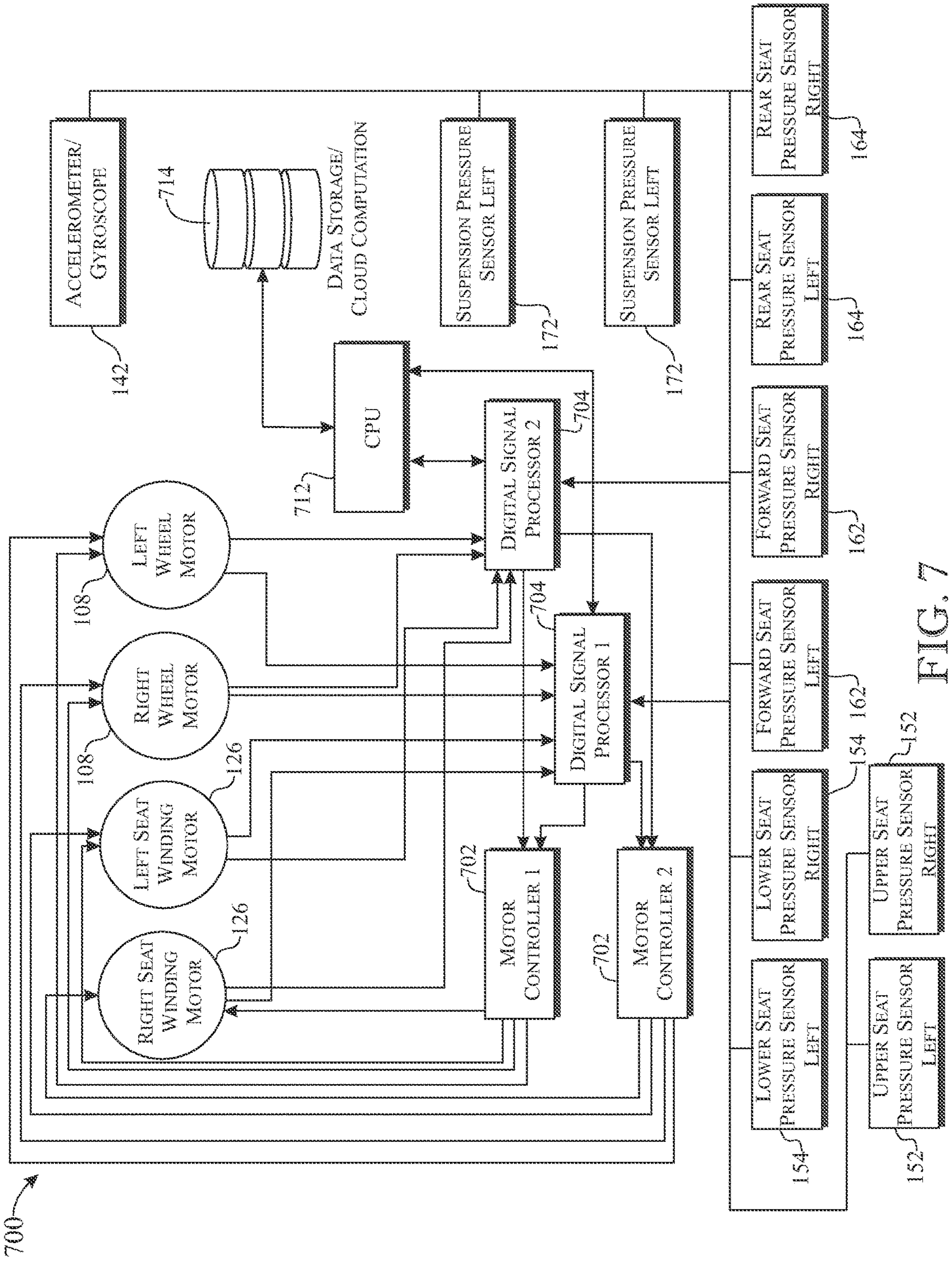
FIG. 7 presents a electronic component diagram of a smart-assistive mobility system, in accordance with an embodiment of the present invention.

Referring now to FIG. 7, and continuing to refer to FIGS. 1A, 1B, 2B 4, 5C, and 5D, an electronic component diagram 700 of a smart-assistive mobility system according to an embodiment of the present invention will now be described in detail. Generally speaking, a smart-assistive mobility apparatus 102, 502 may be configured to carry one or more onboard sensors, each of which may comprise a device, module, machine, and/or subsystem configured to detect an operating event of interest and/or a change in the operating environment of the smart-assistive mobility apparatus 102, 502, and to transmit information regarding this detection to other operatively connected electronics onboard the apparatus 102, 502. As used herein, "operatively connected" may, for example, and without limitation, refer to an arrangement where a processor 712 (also referred to as a controller) may interface between drive motor(s) 108, 126 and sensor(s) 142, 152, 154, 162, 164, 172, such that signals retrieved from the sensor(s) 142, 152, 154, 162, 164, 172 may be used to control, change, and/or affect operation of the motor(s) 108, 126. The processor 712 also may read/write data to/from a data store 714 (either local to or remote from the processor 712), those data including executable computer instructions to govern interactions with all operatively connected electronic components 700.

As described above in detail, the disclosed smart-assistive mobility aid may monitor forces that result from a user's intent to physically manipulate the mobility aid. For example, and without limitation, a smart-assistive mobility system may monitor forces that result from a user displacing the smart-assistive mobility apparatus using the user's feet while sitting in the seat. In the context of electronic component diagram 700, this apparatus movement scenario may entail an onboard accelerometer 142, gyroscope, and/or similar-functioning sensor transmitting one or more intent vector factors to the processor 712 (perhaps processed through a digital signal processor 704 dedicated to sensor monitoring). An analysis algorithm accessible to the processor 712 either onboard (in data store 714) or remotely (cloud computation as described hereinbelow) may determine from the intent vector factors one or more assistive action commands to be executed by the processor 712. The processor, in turn, may operate the left and/or right wheel motors 108 (such operative communication perhaps occurring through a digital signal processor 704 and/or motor controller 702 dedicated to motor operation) to accomplish the assistive action command(s). In this manner, the system may apply a tailored assistive force in a direction of the force vector applied by the user's intent (i.e. user intent vector).

Also for example, a smart-assistive mobility system may monitor the seating action of a user and may automatically and autonomously raise and/or lower the seat to assist the user in standing up, sitting down, and/or adjusting in the seat for comfort. To apply the user intent forces, the user may use arms to push/pull nearby objects, may lean on the apparatus 102, 502 in an intended direction, may twist the user's torso, and/or may swivel the apparatus 102, 502 by grabbing onto a nearby object (e.g., a desk). In the context of electronic component diagram 700, this seat adjustment scenario may entail onboard seat-mounted sensors (e.g., upper seat pressure sensors 152, lower seat pressure sensors 154, forward seat pressure sensors 162, rear seat pressure sensors 164, and/or suspension pressure sensors 172) transmitting one or more intent vector factors to the processor 712 (perhaps processed through a digital signal processor 704 dedicated to sensor monitoring). For example, and without limitation, onboard seat-mounted sensors may comprise a strain gauge (e.g., quarter bridge, half bridge, full bridge, rosette, LY linear) or any similar-functioning sensor appropriate for detecting applied force and pressure. An analysis algorithm accessible to the processor 712 either onboard (in data store 714) or remotely (cloud computation as described hereinbelow) may determine from the intent vector factor(s) one or more assistive action commands to be executed by the processor 712. The processor 712 may operate the left and/or right seat winding motor 126 (such operative communication perhaps occurring through a digital signal processor 704 and/or motor controller 702 dedicated to motor operation) to accomplish the assistive action command(s). These two smart-assistive action processes detailed above are non-limiting examples; more specifically, these processes are not intended to limit the spirit and scope of the disclosure, and these processes are not intended to limit the methods that a user may use to apply user intent vectors (whether rotational or non-rotational).

Figure 8:
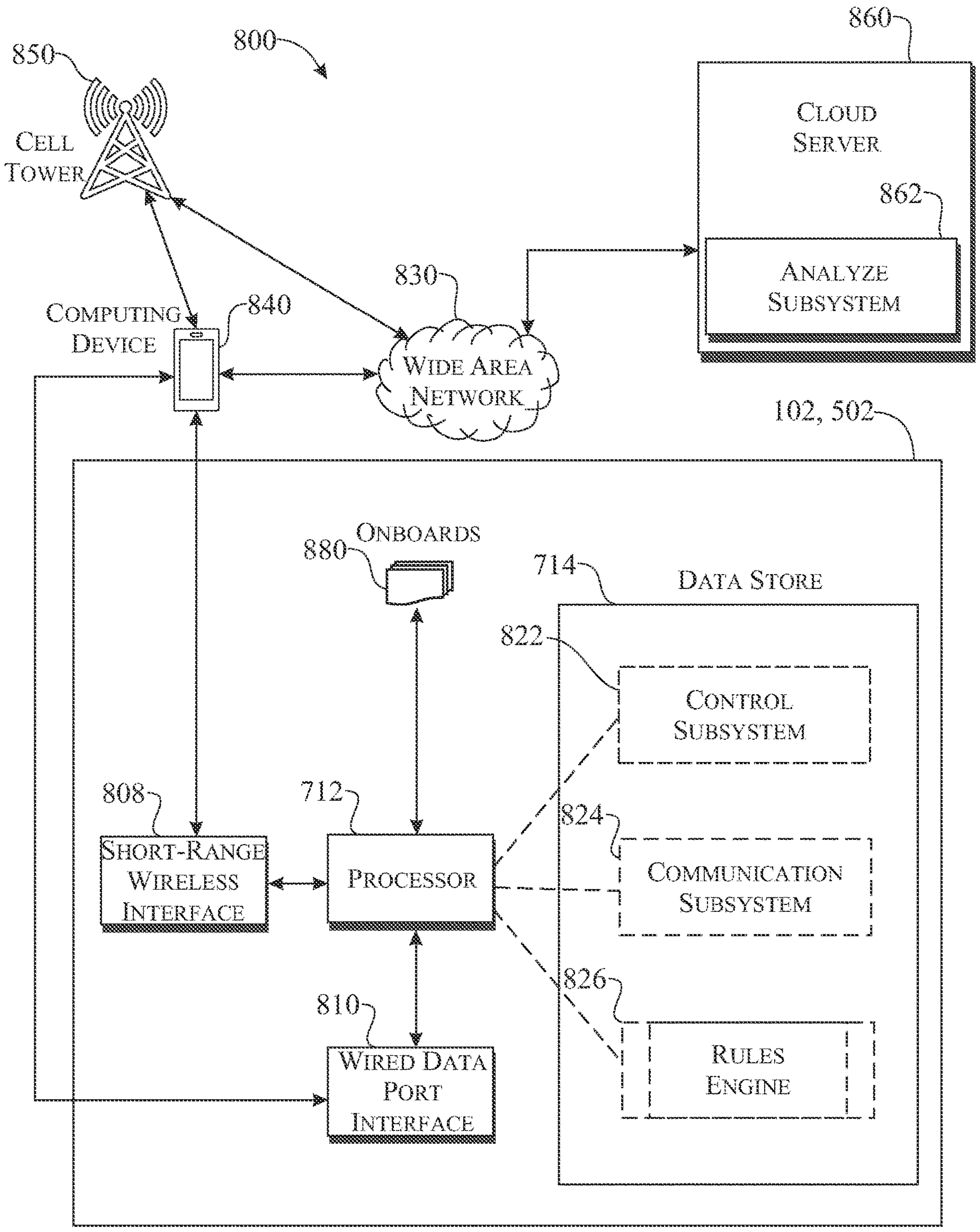
FIG. 8 presents a schematic block diagram of a smart-assistive mobility system, in accordance with an embodiment of the present invention.

Referring now to the schematic block diagram of FIG. 8, a smart-assistive mobility system 800, also referred to as a data-connected mobility system, a smart-assistive mobility service, or a smart-assistive mobility solution, is illustrated in accordance with an exemplary embodiment of the present invention. Those skilled in the art will understand that the principles of the present disclosure may be implemented on or in data communication with any type of suitably arranged device or system configured to perform use-driven data reporting and/or control of a mobility aid, in any combination.

Figure 12A:
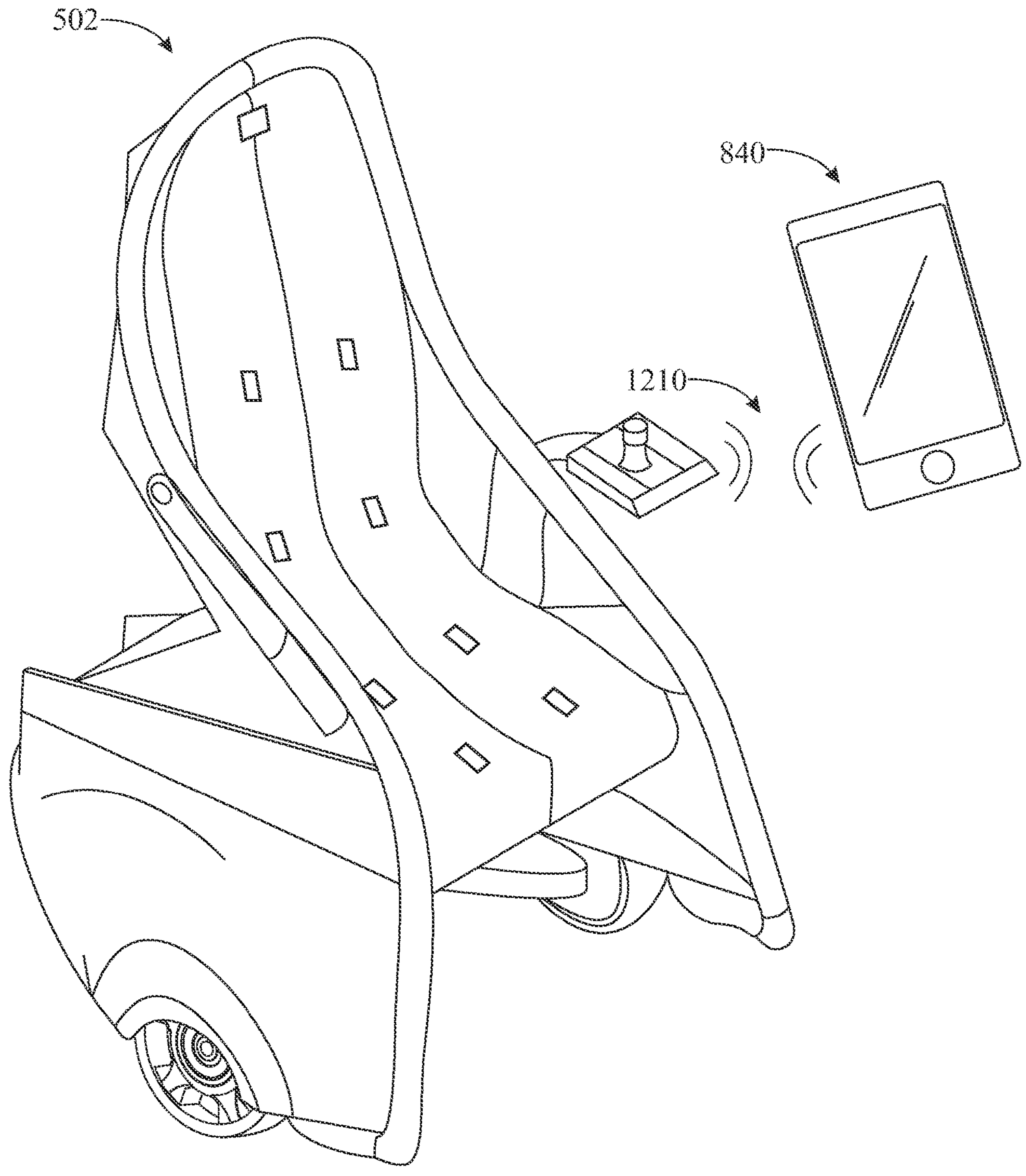
FIG. 12A presents a schematic block diagram of an exemplary wireless configuration for a smart-assistive mobility system, in accordance with an embodiment of the present invention.
Figure 12B:
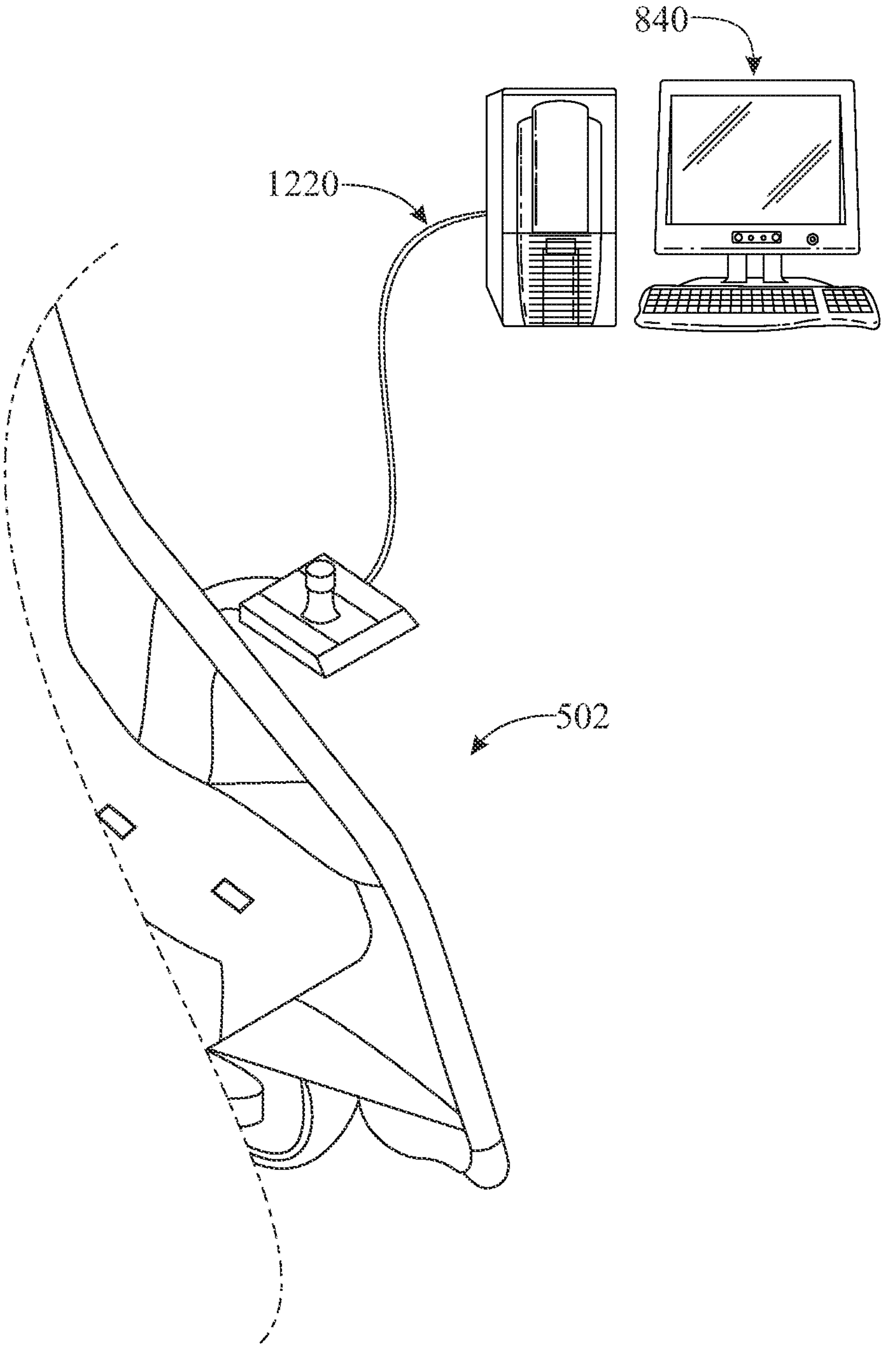
FIG. 12B presents a schematic block diagram of an exemplary wired configuration for a smart-assistive mobility system, in accordance with an embodiment of the present invention.

In the exemplary configuration shown in FIG. 8, the smart-assistive mobility system 800 may comprise the controller 712 (also referred to herein as a "processor" or "microprocessor") that may be operable to accept and execute computerized instructions, and also the data store 714 that may store data and instructions used by the processor 712. More specifically, the processor 712 may be positioned in data communication with some number of external devices and may be configured to direct input from such external devices to the data store 714 for storage and subsequent retrieval. Referring additionally to FIG. 12A, for example, and without limitation, the processor 712 may be configured in wireless data communication 1210 with nearby external computing devices 840, such as a smartphone, through a short-range wireless interface 808 (e.g., Bluetooth®). Referring additionally to FIG. 12B, also for example, and without limitation, the processor 712 may be configured in wired data communication 1220 with external computing devices 840, such as a laptop, through a wired data port interface 810 (e.g., USB). Using such data interfaces to external computing devices 840 that are, in turn, configured in data communication with downstream networking resources (e.g., a wide area network (WAN) 830 and/or a wireless network of servicing cell towers 850), the processor 712 may be configured to direct input received from components of the WAN 830 and/or the wireless network 850 to the data store 714 for storage. Similarly, the processor 712 may be configured to retrieve data from the data store 714 to be forwarded as output to various components of the WAN 830 and/or the wireless network 850. Referring additionally to the electronic component diagram 700 of FIG. 7, the controller/processor 712 and all aforementioned electronic components onboard 880 (to include, collectively, components 108, 126, 142, 152, 154, 162, 164, 172, 702, 704) the smart-assistive mobility apparatus 102, 502 may be powered by a battery (not shown), with the controller/processor 712 regulating power delivery to all other components.

For example, and without limitation, the computerized instructions of the smart-assistive mobility system 800 may be configured to implement a Control Subsystem 822, a Communication Subsystem 824, and/or a Rules Engine 826 that may be stored in the data store 714 and retrieved by the processor 712 for execution. The Control Subsystem 822 may be operable to detect and record onboard conditions triggered by events of interest in the operating environment of the mobility apparatus 102, 502, and to execute commands to operate automated components of the apparatus 102, 502. The Communication Subsystem 824 may be configured to interpret and format use-driven data regarding the mobility apparatus's 102, 502 operating environment, and to deliver the same to onboard display components (e.g., user interface 880) and/or to exchange the same with external computing resources (e.g., cloud-based server 860). For example, and without limitation, executable software on such a networked server 860 may be configured to gather use metrics from a subject smart-assistive mobility apparatus 102, 502, and to analyze those data (e.g., using an Analyze Subsystem 862) and to create and transmit response data back to the mobility apparatus 102, 502 for further onboard processing. The Rules Engine 826, for example, and without limitation, may be implemented as a production rule system configured to recognize conditions in the use-driven data and/or analysis response data (also referred to as use characteristics), and to execute rules in the form of operational commands.

As a matter of definition, a production rule system describes a machine learning computational model implemented as a set of rules, where each rule comprises a condition and a consequential action. Data input to such a system are run through a series of execution cycles, each cycle identifying those rules exhibiting a respective condition match and then executing those matched rules' actions (also referred to as "firing" a rule). A person of skill in the art will immediately recognize that a production rule system model is typically used in constructing an expert system, but that alternative computational models commonly used to define and implement other artificial intelligence constructs may be employed while still accomplishing the many goals, features and advantages according to the present disclosure.

A person of skill in the art will immediately recognize that an advantageous implementation of the smart-assistive mobility system 800 may employ any or all of the Control Subsystem 822, the Communication Subsystem 824, and the Rules Engine 826 collocated upon a single host computing device or distributed among two or more host computing devices. For example, and without limitation, the various components of the smart-assistive mobility system 800 may be implemented onboard the mobility apparatus 102, 502 itself and/or on a smartphone or similar handheld device 840 configured in data communication with a wireless transceiver (such as a cell tower 850).

Those skilled in the art will appreciate that the present disclosure contemplates the use of computer instructions and/or systems configurations that may perform any or all of the operations involved in mobility aid monitoring and operation. The disclosure of computer instructions that include Control Subsystem 822 instructions, Communication Subsystem 824 instructions, Rules Engine 826 instructions, and Analyze Subsystem 862 instructions is not meant to be limiting in any way. Those skilled in the art will readily appreciate that stored computer instructions and/or systems configurations may be configured in any way while still accomplishing the many goals, features and advantages according to the present disclosure.

Figure 9:
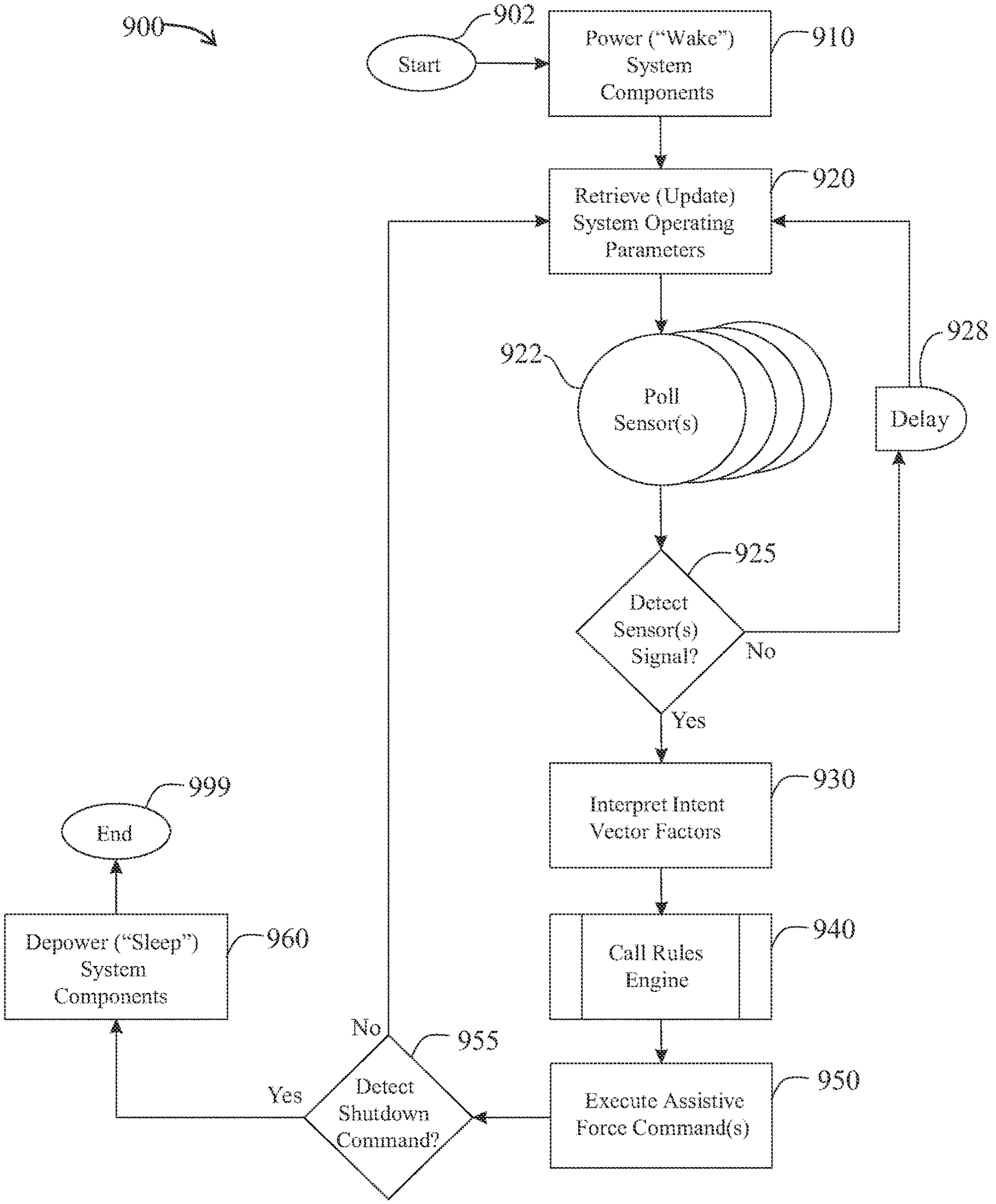
FIG. 9 presents a flowchart illustrating an exemplary smart-assistive mobility system operation method operating in accordance with an embodiment of the present invention.

Referring now to FIG. 9, and continuing to refer to FIGS. 1A, 1B, 2B 4, 5C, 5D, and 8, a method 900 of operating a smart-assistive mobility system 800 is illustrated in accordance with an exemplary embodiment of the present invention. From the start at Block 902, the smart-assistive mobility system 800 may receive a device "wake" signal and may respond by powering all system components 880 (Block 910). For example, and without limitation, this wake signal may be in the form of a manual switching or of an automatic switching (e.g., caused by a user physically engaging the seat 106 of the device 102, 502). At Block 920, the Control Subsystem 822 may retrieve (e.g., download) user-specific operating parameters (also referred to as usage data analyses metrics) captured during previous use(s) of the apparatus 102, 502. The Control Subsystem 822 then may perform the first of a continuous loop (Block 922) of polling for an intent vector parameter(s) transmitted by one or more onboard sensors 142, 152, 154, 162, 164, 172. If, at Block 925, an intent vector trigger condition of interest is not detected by the Control Subsystem 822, then the Control Subsystem 822 may operate to passively monitor unassisted operation of the mobility apparatus 102, 502 before retrieving/updating operating parameters again at Block 920 and continuing the sensor poll loop at Block 922 (after an appropriate delay at Block 928 to enforce a desired sensor polling frequency).

If, at Block 925, an intent vector trigger condition of interest is detected by the system 800, then the Control Subsystem 822 may interpret operating condition metrics (e.g., intent vector factors at Block 930) from those sensor signals and may record the same to the data store 714 for subsequent retrieval and processing. For example, and without limitation, the Communication Subsystem 824 may retrieve and report the intent vector factors to the user of the mobility apparatus 102, 502 via a user interface 880 mounted on the apparatus 102, 502. Alternatively, or in addition, the Communication Subsystem 724 may employ either wireless 1210 and/or wired 1220 networking to report the intent vector factors to local external computing devices 840 and/or to one or more networked computing resources for post-processing (e.g., by an Analyze Subsystem 862 hosted by a cloud server 860).

At Block 940, logic for determining assistive force commands in response to user-specific intent vector input may be implemented as a Rules Engine 826. Such a machine learning construct may advantageously allow configuration and execution of operations during runtime and, therefore, may not require change to the system's 800 core logic in order to build and continually train a user-tailored knowledge base for operating the smart-assistive mobility apparatus 102, 502. Referring additionally to FIG. 10, for example, and without limitation, a rules engine 826 may be trained to govern forward movement automated assistance with rules such as the following:

(Line 1006) Upon power up in a restart state (that is, the system 800 is not being started for the first time and, therefore, does not require a "first boot" system initialization as described hereinbelow), the rules engine 826 may activate condition matching cycle(s) using input vector factors.

(Line 1008) Upon matching of an input vector factor(s) representing a first moment about a left wheel 114 of the apparatus 102, 502 in a counterclockwise (e.g., negative) direction, the rules engine 826 may activate (e.g., return to the processor 712 a command to execute) a first measurement of a duration (e.g., sustain) for which that first moment is maintained by a user of the apparatus 102, 502.

(Line 1010) Upon matching of an input vector factor(s) representing a second moment about a right wheel 114 of the apparatus 102, 502 in a clockwise (e.g., positive) direction, the rules engine 826 may activate a second measurement of a duration (e.g., sustain) for which this second moment is maintained by the user of the apparatus 102, 502.

(Line 1012) Upon matching of an input vector factor(s) representing an acceleration of a seat-mounted accelerometer/gyroscope 142 of the apparatus 102, 502 in a backwards (e.g., negative) direction, the rules engine 826 may activate a third measurement of a duration (e.g., sustain) for which this acceleration is maintained by the user of the apparatus 102, 502.

(Line 1014) Upon matching of an input vector factor(s) representing an increase in pressure against an upper seat pressure sensor(s) 152, the rules engine 826 may activate a fourth measurement of a duration (e.g., sustain) for which this pressure increase is maintained by a user of the apparatus 102, 502. The increase may be measured against a first baseline value (also referred to as an upper seat pressure threshold) captured and stored for a specific-user of the apparatus 102, 502 during, for example, and without limitation, system setup and initialization described hereinbelow.

(Line 1016) Upon matching of an input vector factor(s) representing a decrease in pressure against a lower seat pressure sensor(s) 154, the rules engine 826 may activate a fifth measurement of a duration (e.g., sustain) for which this pressure decrease is maintained by a user of the apparatus 102, 502. This decrease may be measured against a second baseline value (also referred to as a lower seat pressure threshold) captured and stored for a specific-user of the apparatus 102, 502 during, for example, and without limitation, system setup and initialization described hereinbelow.

(Line 1018) Upon matching the sustain times measured for rules 1008, 1010, 1012, 1014 and 1016 as described above against respective conditional thresholds for each, the rules engine 826 may activate assistive actions (that is, return assistive force command(s) to be executed by the system 800 at Block 950 of FIG. 9) for moving forward of the apparatus 102, 502. For example, and without limitation, the motion sustain threshold(s) may be set in the system 800 at two (2) seconds for all involved sensors, or at differing sustain thresholds for any or all sensors. A person of skill in the art will immediately recognize that any number and combination of rules may be learned, captured, and updated to achieve the move forward assistance scenario. For example, various rules may return assistive force command (s) to be executed by the system 800 at Block 950 of FIG. 9 to manipulate wheels 114 using wheel motors 108 to deliver the assistive force vector to complement the user's intent vector, as described in detail above.

(Line 1020) Continuing the assist move forward scenario as illustrated in FIG. 10 and as described above, while an assist move forward operation is underway the rules engine 826 may recognize this active condition as an ongoing trigger to capture operational information regarding the assisted action. For example, and without limitation, an "assist move forward" command may have the system 800 operate available wheel motors 108 to accelerate available wheels 114 at 0.025 meters/second for three (3) seconds. When the operation comes to an end (e.g., after the three second operation range), a rule may fire to record the operational information, for example, and without limitation, to a local data store 714 for post-processing purposes (e.g., training to changing user requirements, and analyzing trends in apparatus operation). These data, upon a rule matching a user-defined and/or system administrator set time interval (Line 1030), may be uploaded to post-processing computing resources (e.g., cloud-based server 860) for remote analysis 862.

(Line 1022) When the assist move forward operation comes to an end (that is, operation range exceeded), the rules engine 826 may activate assistive actions (that is, return assistive force command(s) to be executed by the system 800 at Block 950 of FIG. 9) for deceleration of the apparatus 102, 502.

(Line 1024) When system 800 execution of the deceleration command(s) sequence results in slowing the apparatus to a target speed limit, the rules engine 826 may similarly activate assistive actions for stopping of the apparatus 102, 502.

(Line 1026) The rules engine 826 may also include rules for handling emergent and/or unsafe situations (e.g., a safety loop) that may, for example, and without limitation, activate emergency stopping commands for the apparatus 102, 502 (e.g., commands to operate one or more brakes 138 when a user intent vector signals a standing position by the user and/or a user engaging a manual override switch (not shown, but located, for example, and without limitation, on one or more of the joystick 116 and the handle(s) 510). Also for example, and without limitation, a safety loop may allow the user to execute a sequence of rules (Line 1028) to reset stored operational parameters to baseline values (e.g., prior to user-specific knowledge base training) to force erasure of an unsafe condition potentially created through training.

A person of skill in the art will immediately recognize that any number and combination of rules may be learned, captured, and updated to achieve any number of assistance scenarios (that is, not only assist move forward, but also assist move backward, assist rotate, assist stand up, assist sit down, and or assist workout/exercise sequence, all for example, and without limitation). Such rules may return assistive force command(s) to be executed by the system 800 at Block 950 of FIG. 9 to manipulate wheels 114 using wheel motors 108, and/or to adjust a seat 106 within a frame 104 using seat winding motors 126, as described in detail above.

Referring now to FIG. 11, and continuing to refer to FIG. 10, the exemplary rules engine 826 may be further trained with new system initialization rules such as the following:

(Line 1002) Upon power up in an initial start state (that is, the system 800 is being started for the first time and, therefore, requires a "first boot" system initialization), the rules engine 826 may activate condition matching cycle(s) to lead a primary user of the apparatus 102, 502 through baselining of needed system values to seed the machine learning process going forward.

(Line 1118) In initialization mode, the rules engine 826 may prompt (e.g., using an onboard user interface 880 and/or using an app executing on a smartphone 840) the intended user of the apparatus 102, 502 to accomplish one or more motions directed toward the activity of standing up from the apparatus 102, 502. For example, and without limitation, the system 800 may prompt the user to stand up ten (10) times, all the while testing various assist commands (at Block 950 of FIG. 9) and automatically recording if/how the standing action was assisted (e.g., the user held an object in front of the apparatus 102, 502; the user pushed off of the apparatus 102, 502; the user stood unassisted; the user initiated standing at a particular geolocation). If, during this guided system training, the user is unable to stand unassisted, the system 800 may allow manual selection via user interface 840, 880 of an option to slowly lift a seat 106 of the apparatus 102, 502 so as to collect automated feedback from onboard servos (e.g., seat winding motors 126) to determine electrical load (that is, the amperage required to move the motor(s)). In this way, these servos may operate as available "sensors" to detect user-provided assistance to a standing motion, and to feed this information to the system's 800 algorithm for computing assistive forces for remaining training passes. After training is complete, test movements may be guided by the system 800. For example, and without limitation, the system 800 may prompt the user to perform the standing motion with the system 800 causing the apparatus 102, 502 to automatically assist. The system 800 may also prompt the user for confirmation that trained assistance levels are comfortable and acceptable to the user.

Still in initialization mode, the rules engine 826 may continue to prompt (e.g., using an onboard user interface 880 and/or using an app executing on a smartphone 840) the intended user of the apparatus 102, 502 to accomplish one or more motions toward the activities of moving the apparatus 102, 502 forward (Line 1120), backward (Line 1122), and/or in a rotational motion (Line 1124). For example, and without limitation, the system 800 may prompt the user to move in the desired way, all the while testing various assist commands (at Block 950 of FIG. 9) and automatically recording if/how the movement action was assisted (e.g., the user pushed with feet on the floor beneath the apparatus 102, 502; the user pushed off of the apparatus 102, 502 using arms). Once again, the system 800 may collect feedback from onboard servos (e.g., wheel motors 108) to detect user-provided assistance to these apparatus-manipulating motions (e.g., input inertia, maximum load, duration of load), and to feed this information to the system's 800 algorithm for computing assistive forces required by a specific user. After training is complete, test movements may be guided by the system 800. For example, and without limitation, the system 800 may prompt the user to perform the forward, backward, and rotate motions, in turn, with the system 800 causing the apparatus 102, 502 to automatically assist. The system 800 may also prompt the user for confirmation that trained assistance levels are comfortable and acceptable to the user.

(Line 1126) Still in initialization mode, the rules engine 826 may continue to prompt (e.g., using an onboard user interface 880 and/or using an app executing on a smartphone 840) the intended user of the apparatus 102, 502 to configure the system 800 for general health and comfort and/or for specific exercise functions using the apparatus 102, 502. For example, and without limitation, the system 800 may prompt the user to react to sample, automatic manipulations of the apparatus 102, 502 to set user-desired acceleration/deceleration speeds, ride stiffness, ride height, assistance/resistance levels, and/or lifting speeds. Also for example, and without limitation, the system 800 may allow the users to select "workout" or "exercise" mode to cause the system 800 to operate the apparatus 102, 502 to guide the user through various physical fitness or rehabilitation motions (e.g., squat/stand fifteen (15) times; use one leg to push away apparatus 102, 502 against automated resistance; turn apparatus 102, 502 in circles; grab object such as sink and pull toward it first, then push away, both actions operating against automated resistance). Such guided maneuvers may take place while the system 800 tests various assist commands (at Block 950 of FIG. 9) and automatically records if/how the exercise action was assisted.

(Line 1128) Still in initialization mode, the rules engine 826 may continue to prompt (e.g., using an onboard user interface 880 and/or using an app executing on a smartphone 840) the intended user of the apparatus 102, 502 to configure the system 800 to allow geolocation tracking of the apparatus 102, 502. Such a feature may advantageously allow certain users suffering from dementia of some form to track the apparatus 102, 502 in the event of loss or misplacement.

(Line 1130) When the training sequence comes to an end, a rule may fire to record the training information, for example, and without limitation, to a local data store 714 for subsequent processing purposes. These data, upon a rule identifying availability of access to off board data communication (Line 1132), may be uploaded to computing resources (e.g., cloud-based server 860) to seed remote analysis 862. Such analyses may include health tracking, for example, and without limitation, in the form of metrics related to assistance decrease/resistance increase over time, distance travelled in hybrid mode (i.e., manual operation along with apparatus assistance), time using hybrid mode, hours standing, hours during which user moved more than ten minutes, and similar indicators of physical activity using and embodiment of the present invention.

Referring again for FIG. 9, upon detection of one or more assistive force commands returned from the Rules Engine 826 at Block 950, then the Control Subsystem 822 may operate to execute the received commands (Block 950) to alter operation of the smart-assistive mobility apparatus 102, 502. If, at Block 955, the operation alteration directed by the Rules Engine 826 is a shutdown (also referred to as "sleep") command, then the Control Subsystem 822 may depower all assistive system components 880 (Block 960) before the method 900 ends at Block 999. If no sleep command is detected by the Control Subsystem 422 at Block 955, then monitoring of intent vector trigger conditions (including recurring checks for user-specific operating parameters updates captured during the current apparatus 102, 502 use) may continue at Blocks 920, 922, 925, 928 as described above.

In the manner described above, machine learning methods may be implemented in certain embodiments of the present invention. For example, and without limitation, all intent and assistance force data may be aggregated (especially during initial system setup via an app) and these force data may be used to calibrate the responsiveness of the various onboard motors. Artificial intelligence may be used to anticipate motions based on the aggregate force data from any appropriate motion a specific user makes. Various robotics technologies may be included as appropriate. A mobile application (e.g. Internet-of-Things integration) may accompany the system. For example, a mobile application may be used for joystick control or setting parameters such as resistance, or initial start-up learning sequences, or calibration processes of the smart-assistive mobility apparatus.

Consumers often own and use more than one mobility aid and other potentially complementary electronic devices. Referring again to FIGS. 12A and 12B, a person of skill in the art will immediately recognize that both the wireless 1210 and wired 1220 data communication features of the present invention design may enable data sharing amongst mobility aids and/or between mobility aids and other electronic devices.

In summary, the disclosed smart-assistive mobility aid may monitor forces that result from a user's intent to move the aid. More particularly, the smart-assistive mobility system may monitor forces that result from a user displacing the smart-assistive mobility apparatus using the user's feet while sitting in the apparatus. The system may direct application of an assistive force in a direction of the force vector applied by the user's intent (i.e. user intent vector). Furthermore, the system may monitor the seating of the user and may automatically and autonomously raise and/or lower the seat to assist the user in standing up and sitting down. To apply the user intent forces, the user may use arms to push/pull nearby objects, may lean on the apparatus in an intended direction, may twist the user's torso, and/or may swivel the apparatus by grabbing on a nearby desk. The smart-assistive mobility apparatus and associated systems and methods may allow a user to exercise the user's legs to move the smart-assistive mobility apparatus while providing an assistive force so that the entire burden of moving the apparatus does not lie on the user's leg strength. Helping the user stand up and sit down may be an advantageous feature because it allows users with weak legs to stand up on their own. As described herein, the examples provided hereinabove are non-limiting examples that are not intended to limit the spirit and scope of the disclosure, and more particularly, are not intended to limit the methods that a user may use to apply user intent vectors (whether rotational or non-rotational).

In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. The scope of the invention should be determined by the appended claims and their legal equivalents.

What is claimed is:

1. A smart-assistive mobility system comprising:

a rules engine configured to:

receive a first user intent vector that corresponds to a force applied by a user to displace a smart-assistive mobility apparatus, receive a first usage data analysis metric that corresponds to one or more user-specific operating parameters captured during previous use(s) of the smart-assistive mobility apparatus by the user, match at least one of the first user intent vector and the first usage data analysis metric to a condition of a rule, and determine, by firing an action of the rule, an assistive action command of an assist type selected from the group consisting of a stand up assist, a sit down assist, a move forward assist, a move backward assist, a move rotate assist, and a move exercise assist, wherein the assistive action command is to assist displacement of the smart-assistive mobility apparatus in the direction of the user intent vector.

2. The smart-assistive mobility system according to claim 1, wherein the rules engine is further configured to:

display an initialization sequence comprising one or more of a stand up assist prompt, a sit down assist prompt, a move forward assist prompt, a move backward assist prompt, a move rotate assist prompt, and a move exercise assist prompt, receive a training intent vector in response to the initialization sequence, and determine the first usage data analysis metric from the training intent vector.

3. The smart-assistive mobility system according to claim 1, wherein the assistive action command is directed to operate one of a wheel motor and a seat winding motor of the smart-assistive mobility apparatus to apply an assistive force in the direction of the user intent vector.

4. The smart-assistive mobility system according to claim 1, wherein the rules engine is further configured to:

receive a second user intent vector associated with an execution of the assistive action command, and determine a second usage data analysis metric from the second user intent vector.

5. The smart-assistive mobility system according to claim 1, further configured to:

receive at least one user-motion signal from a sensor of the smart-assistive mobility apparatus, the sensor being one of: a pressure sensor, an acceleration sensor, and an inertial sensor, and determine the first user intent vector at least in part from the at least one user-motion signal.

6. The smart-assistive mobility system according to claim 1, wherein the assistive action command is directed to an operation of one of a wheel motor and a seat winding motor of the smart-assistive mobility apparatus to apply an assistive force in a direction common to the first user intent vector.

7. The smart-assistive mobility system according to claim 6, wherein the assistive action command is directed to the operation of the wheel motor to deliver a move forward assistive force.

8. The smart-assistive mobility system according to claim 6, wherein the assistive action command is directed to the operation of the seat winding motor to deliver a stand up assistive force.

9. The smart-assistive mobility system according to claim 1, further configured to upload the first user intent vector to an external computing device via at least one of a wireless interface and a wired data port interface.

10. The smart-assistive mobility system according to claim 1, further configured to download the first usage data analysis metric from an external computing device via at least one of a wireless interface and a wired data port interface.

11. A smart-assistive mobility system utilizing a computer processor and a non-transitory computer-readable storage medium comprising a plurality of instructions which, when executed by the computer processor, is configured to:

receive a first user intent vector that corresponds to a force applied by a user to displace a smart-assistive mobility apparatus, receive a first usage data analysis metric that corresponds to one or more user-specific operating parameters captured during previous use(s) of the smart-assistive mobility apparatus by the user, match at least one of the first user intent vector and the first usage data analysis metric to a condition of a rule, and determine, by firing an action of the rule, an assistive action command of an assist type selected from the group consisting of a stand up assist, a sit down assist, a move forward assist, a move backward assist, a move rotate assist, and a move exercise assist, wherein the assistive action command is to assist displacement of the smart-assistive mobility apparatus in the direction of the user intent vector.

12. The smart-assistive mobility system according to claim 11, further configured to:

display an initialization sequence comprising one or more of a stand up assist prompt, a sit down assist prompt, a move forward assist prompt, a move backward assist prompt, a move rotate assist prompt, and a move exercise assist prompt, receive a training intent vector in response to the initialization sequence, and determine the first usage data analysis metric from the training intent vector.

13. The smart-assistive mobility system according to claim 11, wherein the assistive action command is directed to operate one of a wheel motor and a seat winding motor of the smart-assistive mobility apparatus to apply an assistive force.

14. The smart-assistive mobility system according to claim 11, wherein the rules engine is further configured to:

receive a second user intent vector associated with an execution of the assistive action command, and determine a second usage data analysis metric from the second user intent vector.

15. The smart-assistive mobility system according to claim 11, further configured to:

receive at least one user-motion signal from a sensor of the smart-assistive mobility apparatus, the sensor being one of: a pressure sensor, an acceleration sensor, and an inertial sensor, and determine the first user intent vector at least in part from the at least one user-motion signal.

16. The smart-assistive mobility system according to claim 11, wherein the assistive action command is directed to an operation of one of a wheel motor of the smart-assistive mobility apparatus to deliver a move forward assistive force in a first direction common to the first user intent vector and a seat winding motor of the smart-assistive mobility apparatus to deliver a stand up assistive force in a second direction common to the first user intent vector.

17. The smart-assistive mobility system according to claim 11, further configured to upload the first user intent vector to an external computing device via at least one of a wireless interface and a wired data port interface.

18. The smart-assistive mobility system according to claim 11, further configured to download the first usage data analysis metric from an external computing device via at least one of a wireless interface and a wired data port interface.

19. A computer-implemented method of smart-assistive mobility aid operation, the method comprising:

receiving a user intent vector that corresponds to a force applied by a user to displace a smart-assistive mobility apparatus, receiving a usage data analysis metric that corresponds to one or more user-specific operating parameters captured during previous use(s) of the smart-assistive mobility apparatus by the user, matching at least one of the user intent vector and the usage data analysis metric to a condition of a rule, and determining, by firing an action of the rule, an assistive action command of an assist type selected from the group consisting of a stand up assist, a sit down assist, a move forward assist, a move backward assist, a move rotate assist, and a move exercise assist, wherein the assistive action command is to assist displacement of the smart-assistive mobility apparatus in the direction of the user intent vector.

20. The computer-implemented method according to claim 19, wherein the assistive action command is directed to an operation of one of a wheel motor of the smart-assistive mobility apparatus to deliver a move forward assistive force in a first direction common to the user intent vector and a seat winding motor of the smart-assistive mobility apparatus to deliver a stand up assistive force in a second direction common to the user intent vector.

* * * * *